US012643281B1

(12) United States Patent
Johnston et al.

(10) Patent No.: US 12,643,281 B1
(45) Date of Patent: Jun. 2, 2026

(54) METHOD OF MANUFACTURING A BENT COMPOSITE PUTTER SHAFT

(71) Applicant: Topgolf Callaway Brands Corp., Carlsbad, CA (US)

(72) Inventors: Logan Johnston, Vista, CA (US); Tom Pulido, Carlsbad, CA (US); Robert Gonczi, Oceanside, CA (US); Brandon DeMille, Carlsbad, CA (US); Patrick Dawson, Poway, CA (US); William Mellor, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 160 days.

(21) Appl. No.: 18/623,920

(22) Filed: Apr. 1, 2024

Related U.S. Application Data

(63) Continuation-in-part of application No. 17/497,643, filed on Oct. 8, 2021, now abandoned.

(60) Provisional application No. 63/457,217, filed on Apr. 5, 2023, provisional application No. 63/091,434, filed on Oct. 14, 2020.

(51) Int. Cl.
| | |
|---|---|
| *B29L 31/52* | (2006.01) |
| *B29C 53/08* | (2006.01) |
| *B29C 53/42* | (2006.01) |
| *A63B 53/00* | (2015.01) |
| *A63B 53/10* | (2015.01) |

(52) U.S. Cl.
CPC ............ *B29C 53/42* (2013.01); *B29C 53/083* (2013.01); *A63B 53/007* (2013.01); *A63B 53/10* (2013.01); *B29L 2031/52* (2013.01)

(58) Field of Classification Search
None
See application file for complete search history.

(56) References Cited

U.S. PATENT DOCUMENTS

| | | | | |
|---|---|---|---|---|
| 4,158,586 | A | * | 6/1979 | Usui ..................... B29C 53/083 156/196 |
| 5,384,085 | A | * | 1/1995 | Houser ................... B29C 33/60 264/316 |
| 5,417,567 | A | * | 5/1995 | Peter ....................... F27D 5/005 432/247 |
| 2007/0298902 | A1 | * | 12/2007 | Hasegawa .............. A63B 60/42 473/282 |

FOREIGN PATENT DOCUMENTS

CS          240129 B1 *  2/1986

OTHER PUBLICATIONS

Dunstone, "Hi-Shrink Polyester Tape TDS," March, 7th, 2015. <https://agaus.com.au/content/Technical-Data/> (Year: 2015).*

* cited by examiner

*Primary Examiner* — Armand Melendez
(74) *Attorney, Agent, or Firm* — Michael A. Catania; Daniel Moderick

(57) ABSTRACT

A methodology for obtaining a full carbon fiber reinforced polymer double bend putter shaft wherein the summation of the two bending angles is 9 degrees is disclosed herein. Starting pre-resin impregnated unidirectional carbon fiber reinforced polymers are sectioned into ply patterns and wrapped on mandrel. The wrapped mandrel is placed in a furnace to elevate the viscosity of the resin for bending on a pipe bender, followed by heating and curing vertically.

4 Claims, 24 Drawing Sheets

100

102

Cut Prepreg
Sheets to
Shape

104

Bend Metal
Tube to
Desired
Shape

106

Wrap Tubing
with Multiple
Layers of
Composite

108

Wrap
Tape
Around
Shaft

112

Cure

114

Cosmetic
Finishing

110

Apply
Tubular
Composite
Over Tubing

10

12

14,16

Section A-A

3400

3600

3700

3800

3900

4200

4300

METHOD OF MANUFACTURING A BENT COMPOSITE PUTTER SHAFT

CROSS REFERENCES TO RELATED APPLICATIONS

The Present Application claims priority to U.S. Provisional Patent Application No. 63/457,217, filed on Apr. 5, 2023, and the Present Application is a continuation-in-part application of U.S. patent application Ser. No. 17/497,643, filed on Oct. 8, 2021, which claims priority to U.S. Provisional Patent Application No. 63/091,434, filed on Oct. 14, 2020, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to a method of manufacturing a lightweight, low-torque, composite golf club shaft with a bent tip that exceeds a frequency threshold, and methods of making such composite golf club shafts.

Description of the Related Art

Prior art graphite golf club shafts are built by cutting pre-made graphite sheets, applying these sheets over a contoured metal rod, and then rolling the shaft. This process is repeated to make a multilayer shaft. A layer of cellophane tape is applied to provide pressure to the graphite during the curing step. The shaft is then placed in an oven and cured. The shafts are placed on a centerless grinder to finalize the shape and remove residual tape, and then are cut to length, painted, and decorated with decals.

The rolling, curing, and grinding processes of this prior art method only allow for the production of straight golf club shafts, which is not ideal because golfers often prefer bent tip shafts, particularly for putters, so they can produce enough shaft flex during a swing. The golf industry has worked around this issue by making bi-matrix shafts, where bent tips made from steel are bonded to a straight, graphite shaft. This configuration adds expense and time to the shaft making process, however, and the combined product is heavier than a completely composite shaft. Therefore, there is a need for an improved bent tip golf club shaft, and improved methods of manufacturing such shaft.

BRIEF SUMMARY OF THE INVENTION

One aspect of the present invention is a methodology for obtaining a full carbon fiber reinforced polymer double bend putter shaft wherein the summation of the two bending angles is 9 degrees.

Another aspect of the present invention is a completely composite shaft with a bent tip. The bend may include a one or more bends. The shaft may be hollow, completely solid, or have both hollow and solid portions. The composite shaft may be composed of graphite layups, which may be oriented in any direction, and which may be unidirectional, woven, or braided. The shafts can be stepped or stepless, e.g., tapered, and may have parallel or tapered tips. The shafts may be used for cup hosels and spud hosels. The shafts are lighter than steel, have low torque values, and meet a minimum frequency measurement.

Other aspects of the present invention are methods of making a composite shaft with a bent tip. In one method, a thin-walled aluminum tube is bent to the desired profile, and graphite sheets are wrapped around the aluminum tube. Tape is applied to provide pressure during a standard curing process. At the end of the process, the aluminum tube remains inside the finished shaft. In another method, graphite sheets are wrapped around a removable core, which may be made from an elastomeric material such as rubber, foams, or salts. The core may run the entire length of the shaft or just the length of the bent portion. The shaft is then heated to a temperature above the glass transition temperature Tg and the tip of the shaft is placed into a mold to bend it. The core is ultimately removed from the shaft to create a hollow shaft, though in an alternate embodiment the core may be left within the final product. In yet another method, a bladder mold may be used to achieve the desired tip bends. In another method, a bladder is placed at the tip of a tapered rod and covered with a removable straight tip, and graphite sheets are applied to the rod according to prior art methods and partially cured. While the part is still above the Tg, the removable straight tip is removed, the shaft is formed into a mold at the tip, and the bladder is inflated. After cure, the bladder is deflated and the rod is removed.

Yet another aspect of the present invention is a method of manufacturing a golf club shaft comprising the steps of providing a bent tube composed of a rigid material, the bent tube having a first shape, inserting a removable mandrel into the bent tube, cutting composite material into a plurality of composite pieces, wrapping the composite pieces around the bent tube to form a first precursor shaft, wrapping tape around the first precursor shaft, curing the first precursor shaft to form a second precursor shaft, removing the mandrel from the second precursor shaft, and applying cosmetic features to the second precursor shaft to create the final golf club shaft. In some embodiments, the first shape may comprise a first bend with a first bend angle of 10 to 30 degrees, and may also comprise a second bend with a second bend angle, and wherein the second bend angle is 10 to 30 degrees. In a further embodiment, the first bend angle may be 20 to 25 degrees, and the second bend angle may be 12 to 16 degrees. In another embodiment, the method may further comprise the step of wrapping tubular composite around the first precursor shaft, which step may occur between the step of wrapping tape around the first precursor shaft and the step of curing the first precursor shaft. In any of these embodiments, the rigid material may be selected from the group consisting of metal alloy and polymer, and wherein the composite material is selected from the group consisting of a prepreg material and tubular braided composite. Also in any embodiment, the final golf club shaft may have a torque of less than 1.5 degrees and a frequency of greater than 360 cycles per minute.

Another aspect of the present invention is a method of manufacturing a golf club shaft comprising the steps of cutting composite material into a plurality of composite pieces, engaging a flexible core with a rod composed of a rigid material, wrapping the composite pieces around the flexible core and rod combination to form a first precursor shaft, rolling the first precursor shaft to form a straight, second precursor shaft, wrapping tape around the second precursor shaft, curing the second precursor shaft to form a third precursor shaft with a tip, placing the tip in a forming mold while the tip is at a temperature above Tg, bending the tip within the forming mold to form a fourth precursor shaft with at least one bend, curing the fourth precursor shaft, removing the flexible core and rod combination from the fourth precursor shaft, and applying cosmetic features to the fourth precursor shaft to create the final golf club shaft.

In some embodiments, the at least one bend may comprise a first bend with a first bend angle of 10 to 30 degrees, and may further comprise a second bend with a second bend angle of 10 to 30 degrees. In a further embodiment, the first bend angle may be 20 to 25 degrees and the second bend angle may be 12 to 16 degrees. In any of these embodiments, the final golf club shaft may have a torque of less than 1.5 degrees and a frequency of greater than 360 cycles per minute. In any embodiment, the rigid material may be selected from the group consisting of metal alloy and polymer and the composite material may be selected from the group consisting of a prepreg material and tubular braided composite.

Yet another aspect of the present invention is a method of manufacturing a golf club shaft comprising the steps of cutting composite material into a plurality of composite pieces, providing a core, wrapping the composite pieces around the core to form a first precursor shaft, rolling the first precursor shaft to form a straight, second precursor shaft, wrapping tape around the second precursor shaft, curing the second precursor shaft to form a third precursor shaft with a shaft tip, placing the shaft tip in a forming mold while the shaft tip is at a temperature above Tg, bending the shaft tip within the forming mold to form a fourth precursor shaft with at least one bend, curing the fourth precursor shaft, and applying cosmetic features to the fourth precursor shaft to create the final golf club shaft.

In some embodiments, the method may further comprise the step of installing a metal cylinder on a tip of the core, which step may occur between the step of providing a core and the step of wrapping the composite pieces around the core to form a first precursor shaft, and the final golf club shaft may comprise a pocket in the shaft tip that is formed by the metal cylinder. In an alternative embodiment, the method may further comprise the step of drilling an inner diameter of the shaft tip to form a pocket in the shaft tip, wherein this step may occur between the step of curing the fourth precursor shaft and the step of applying cosmetic features to the fourth precursor shaft to create the final golf club shaft.

In any embodiment, the at least one bend may comprise a first bend with a first bend angle of 10 to 30 degrees, and may also comprise a second bend with a second bend angle of 10 to 30 degrees. In a further embodiment, the first bend angle may be 20 to 25 degrees and the second bend angle may be 12 to 16 degrees. In any embodiment, the final golf club shaft may have a torque of less than 1.5 degrees and a frequency of greater than 360 cycles per minute.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention is directed to a composite, bent tip golf club shaft 10 with improved performance characteristics, and methods of making such golf club shafts. The bent tip shafts disclosed herein allow for a clean and face-balanced golf club head design, especially for putters.

Figure 1:
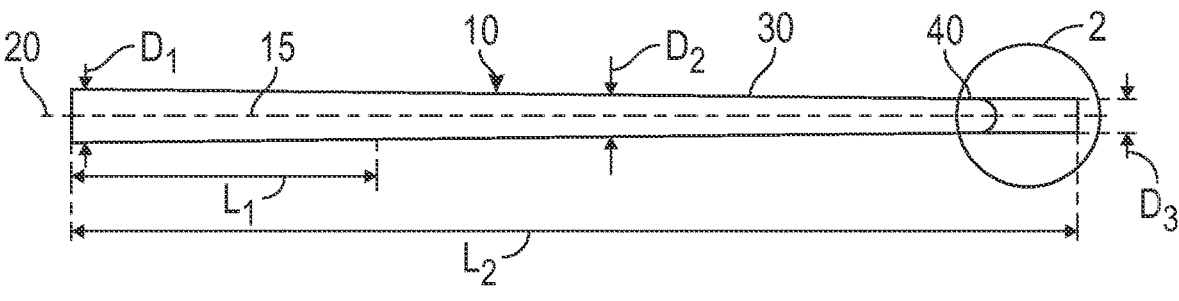
FIG. 1 is a top plan view of a first embodiment of a golf club shaft of the present invention.
Figure 2:
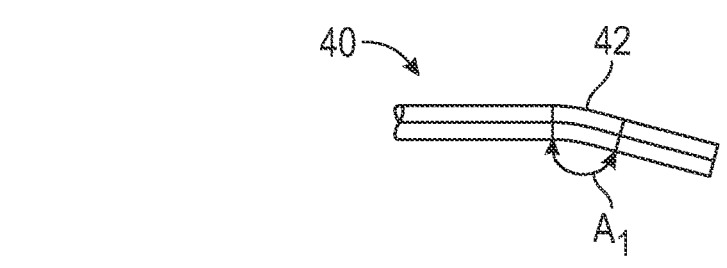
FIG. 2 is an enlarged, side plan view of the circled portion of the embodiment shown in FIG. 1.
Figure 3:
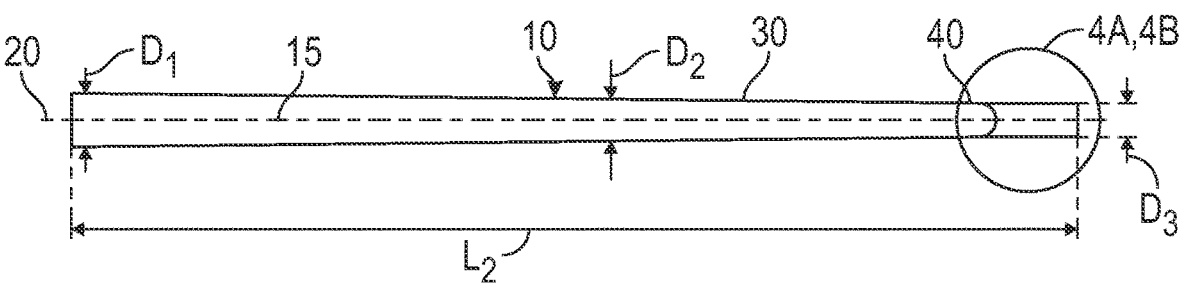
FIG. 3 is a top plan view of a second embodiment of a golf club shaft of the present invention.
Figure 4A:
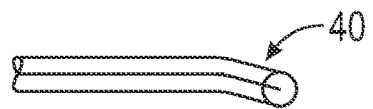
FIGS. 4A and 4B are side plan views of the circled portion of the embodiment shown in FIG. 3.
Figure 4B:
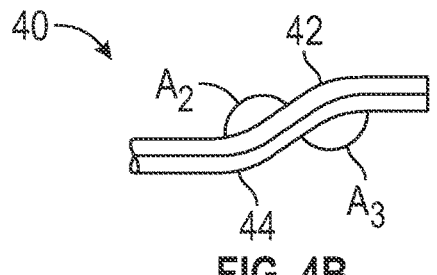

A bent tip golf club shaft 10 of the present invention is shown in FIGS. 1-2. The shaft 10 comprises a butt section 20, a tapered midsection 30, and a tip section 40 with a single bend 42 having a bend angle $A_1$ of 10 to 30 degrees. In a second embodiment, shown in FIGS. 3, 4A, and 4B, the shaft 10 has the same characteristics as the preferred embodiment except that the tip section 40 has two bends 44, 46, each with bend angles $A_2$, $A_3$ that range from 10 to 30 degrees, though $A_2$ preferably is between 20 and 25 degrees and $A_3$ is preferably between 12 and 16 degrees.

In each of these embodiments, an outer diameter $D_1$ of the butt section 20 of the shaft 10 ranges from about 0.550 to about 0.625 inch, preferably from about 0.560 to about 0.615 inch, and most preferably from about 0.600 to about 0.610 inch. In an alternative embodiment, however, the butt section 20 is tapered, and has a reduction in outer diameter of less than about 0.010 inch per linear inch taken along the longitudinal axis 15 of the shaft. In each of these embodiments, the outer diameter $D_2$ of the midsection 30 ranges from 0.300 inch to 0.600 inch, and the outer diameter $D_3$ of the tip section 40 preferably ranges from 0.350 to 0.360 inch.

The length $L_1$ of the butt section 20 in each embodiment generally ranges from about 4 to about 16 inches, and preferably from about 8 to about 14 inches depending on the desired shaft stiffness. The shaft 10 preferably has an overall length $L_2$ of less than about 40 inches, a mass of less than 100 grams, a torque of less than 1.5 degrees, and a frequency greater than 360 cycles per minute (cpm). When assembled into a complete golf club, and particularly a putter, the shaft 10 is paired with a grip with a mass ranging from 40 grams to 65 grams and a putter head with a mass ranging from 300 to 400 grams.

Figure 5:
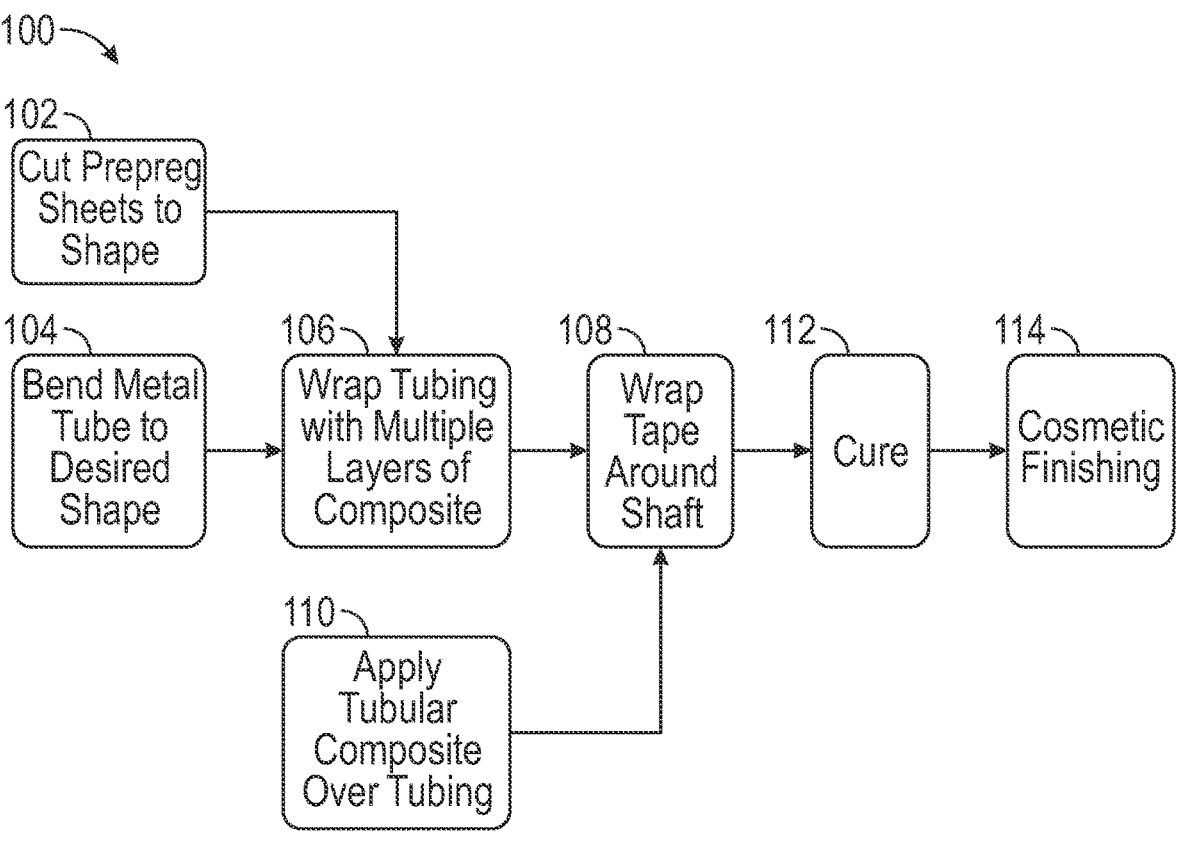
FIG. 5 is a process flow chart illustrating a first method of the present invention.
Figure 6:
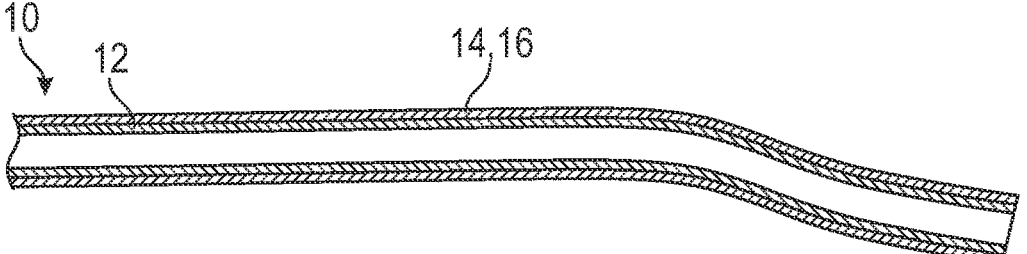
FIG. 6 is an illustration of a golf club shaft created using the method illustrated in FIG. 5.

A first method 100 of manufacturing the bent tip composite golf club shaft 10 of the present invention is shown in FIG. 5. In a first step 102, prepreg composite sheets are cut to shape, and in a second step 104, which may occur concurrently with the first step 102, a rigid tube 12, which may be made from metal (e.g., aluminum, steel, titanium, etc.) or polymer (e.g., plastic, composite), is bent or manufactured to have a desired shape. In a third step 106, the bent tube 12 is wrapped with multiple layers of the prepreg sheets to form a first precursor shaft, and in a fourth step 108, tape is wrapped around the first precursor shaft to provide pressure during curing. In a fifth step 110, which is optional, tubular composite may also be wrapped around the first precursor shaft. In a sixth step 112, the precursor shaft is cured to form a second precursor shaft, and in a seventh, final step 114, the second precursor shaft has cosmetic features applied to form a finished shaft 10, which is illustrated in FIG. 6. This finished shaft 10 includes the bent tube 12 from the second step 104, and the prepreg sheets 14 and/or tubular composite 16.

Figure 7:
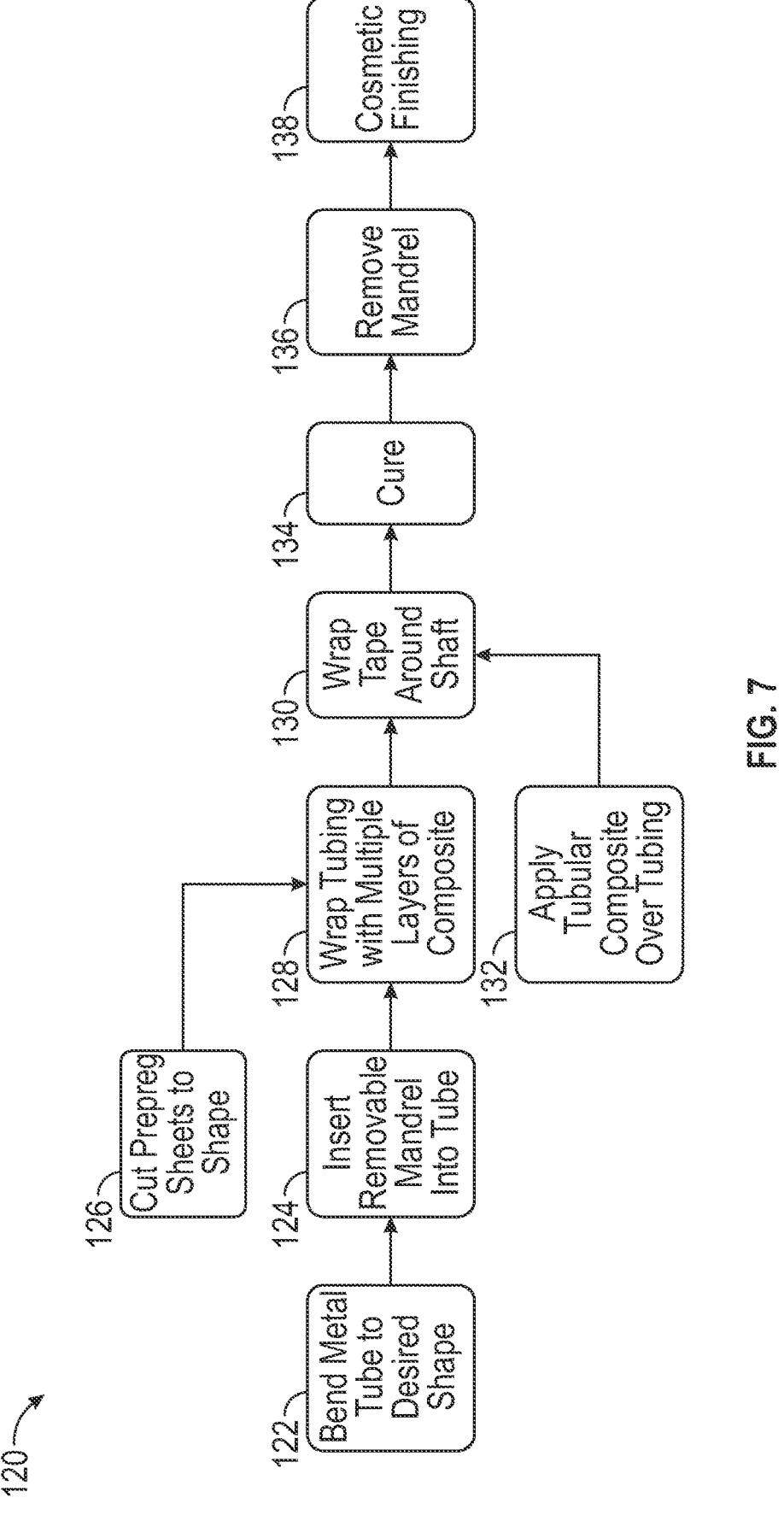
FIG. 7 is a process flow chart illustrating a second method of the present invention.
Figure 8:
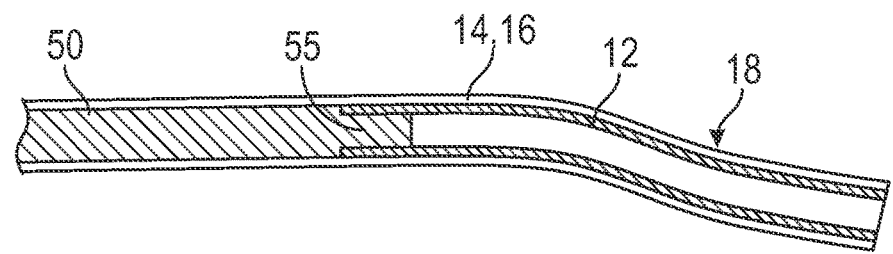
FIG. 8 is an illustration of a golf club shaft precursor created during the method illustrated in FIG. 7.
Figure 9:
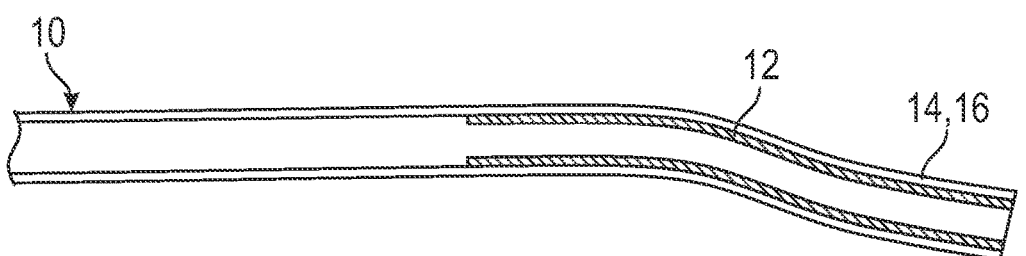
FIG. 9 is an illustration of the final golf shaft product created using the method illustrated in FIG. 7.

A second, preferred method 120 of manufacturing the bent tip composite golf club shaft 10 of the present invention is shown in FIG. 7. In a first step 122, a rigid tube 12, which may be made of metal (e.g., steel, aluminum alloy, titanium, etc.) or polymer (e.g., plastic, composite, etc.), is bent or otherwise manufactured into a desired shape. In a second step 124, a removable mandrel 50 is inserted into the bent tube 12. In a third step 126, prepreg sheets 14 are cut to desired shapes. In a fourth step 128, the prepreg sheets 14 are wrapped around the bent tube 12 to form a first precursor shaft. In a fifth step 130, tape is wrapped around the first precursor shaft to provide pressure during curing, and in a sixth, optional step 132, tubular composite 16 may also be wrapped around the first precursor shaft. In a seventh step 134, the first precursor shaft is cured to form a second precursor shaft 18, illustrated in FIG. 8. In an eighth step 136, the tapered tip 55 of the mandrel 50 is removed from the bent tube 12, and in a ninth step 138, the second precursor shaft 18 is finished via the application of cosmetic features to create the final shaft 10, which is hollow, as shown in FIG. 9.

Figure 10:
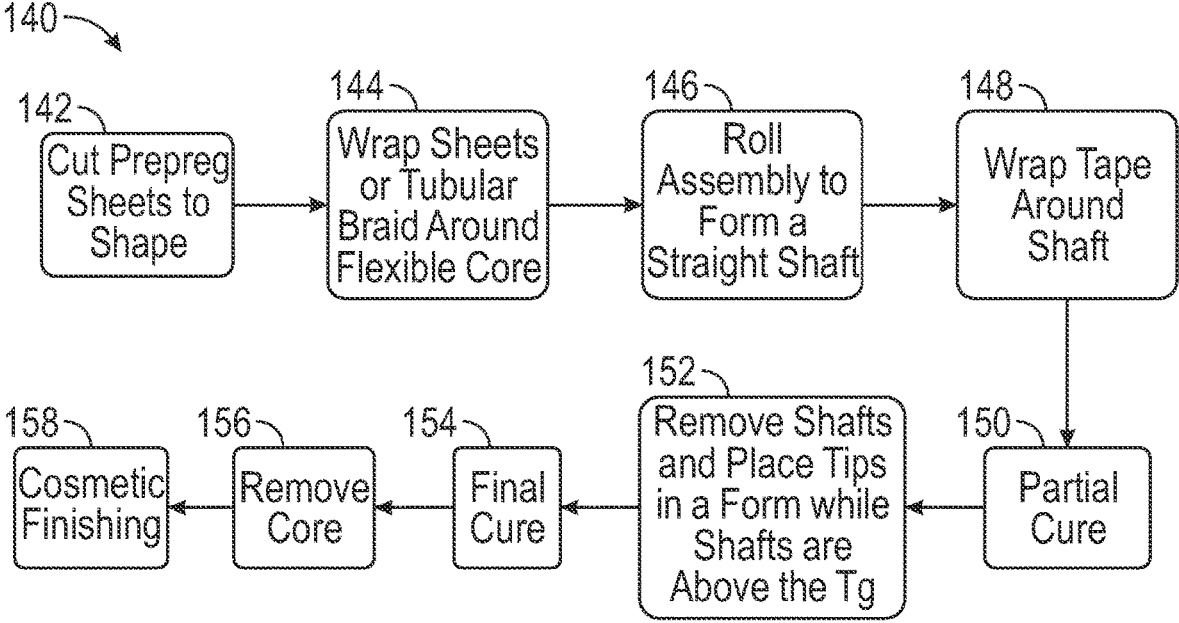
FIG. 10 is a process flow chart illustrating a third method of the present invention.
Figure 11A:
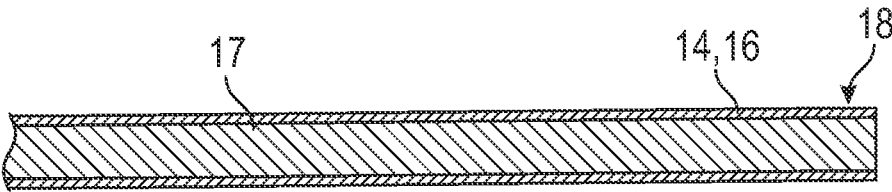
FIGS. 11A and 11B are illustrations of golf club shaft precursors created during the method shown in FIG. 10.
Figure 11B:
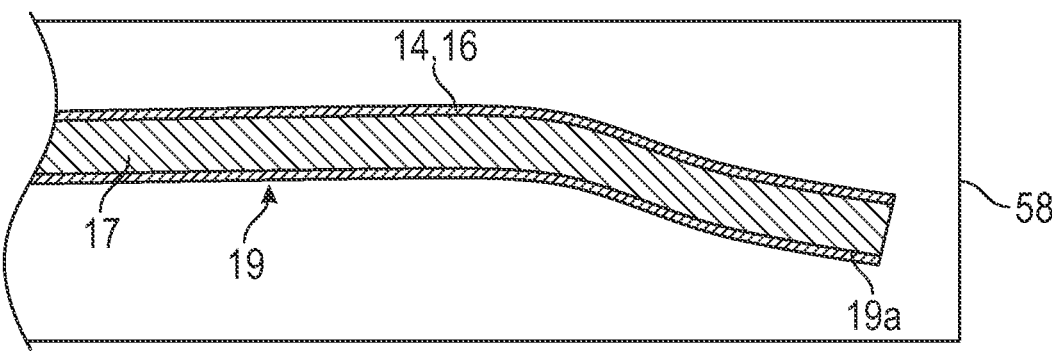
Figure 12:
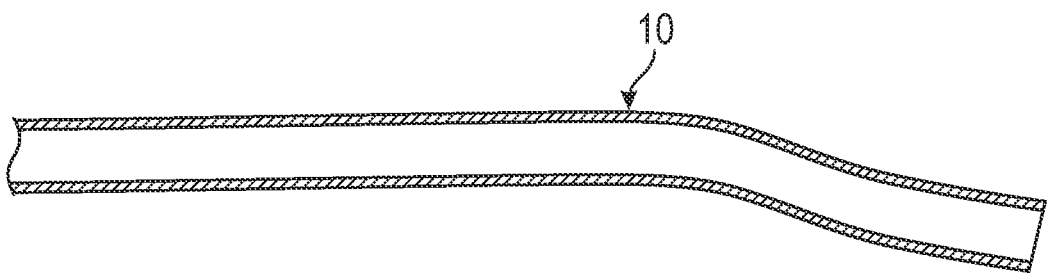
FIG. 12 is an illustration of the final golf shaft product created using the method illustrated in FIG. 10.

A third method 140 of manufacturing a hollow, bent tip composite golf club shaft 10 of the present invention is shown in FIG. 10. In a first step 142, prepreg sheets 14 are cut to desired shape. In a second step 144, the prepreg sheets 14 and/or a tubular braided composite 16 are wrapped around a flexible core 17 to form a first precursor, and in a third step 146, the first precursor is rolled to form a straight, second precursor shaft 18 as shown in FIG. 11A. In a fourth step 148, tape is wrapped around the second precursor shaft 18 to provide pressure during curing, and in a fifth step 150, the resulting combination is partially cured to form a third precursor shaft 19. In a sixth step 152, the tip 19a of the third precursor shaft 19 is placed in a forming mold 58 while still at a temperature above the glass transition temperature Tg, as shown in FIG. 11B, to bend the tip 19a. In a seventh step 154, the resulting structure is subjected to a final cure, in an eighth step 156, the flexible core 17 is removed from the structure, and in a ninth, final step 158, the structure is cosmetically finished to result in the final, hollow golf club shaft 10 shown in FIG. 12.

Figure 13:
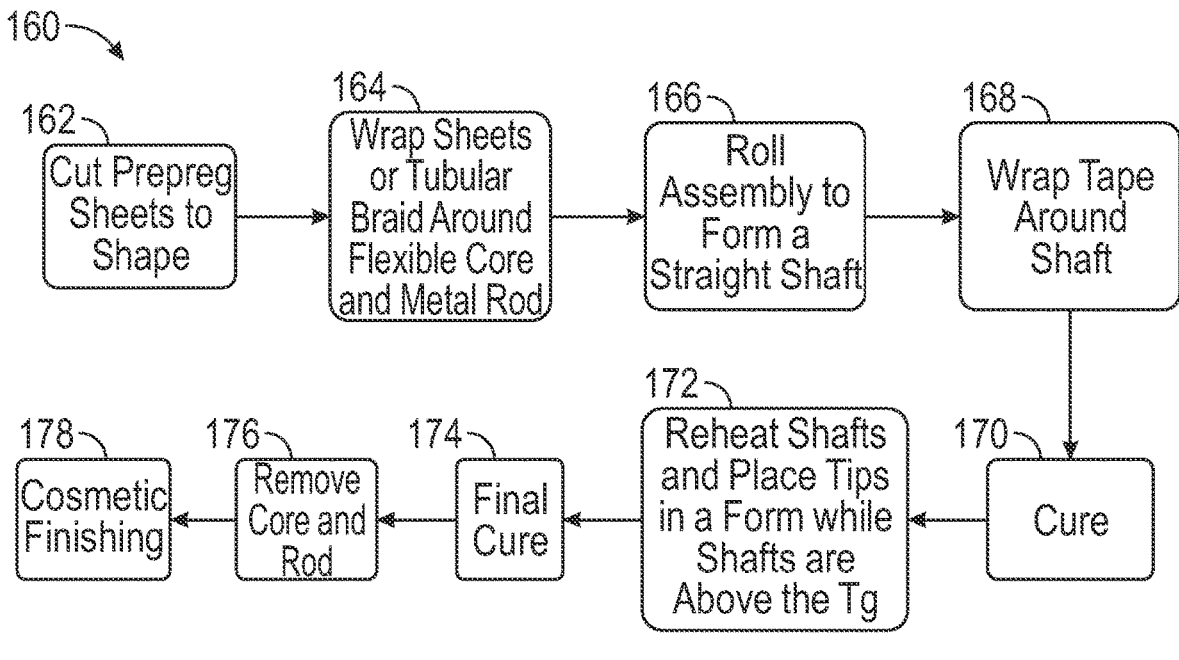
FIG. 13 is a process flow chart illustrating a fourth method of the present invention.
Figure 14A:
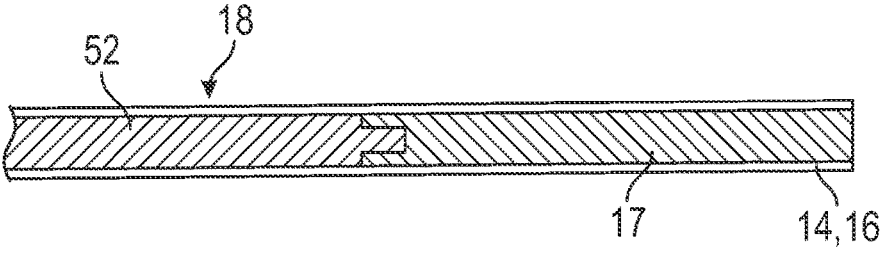
FIGS. 14 and 14B are illustrations of golf club shaft precursors created during the method shown in FIG. 13.
Figure 14B:
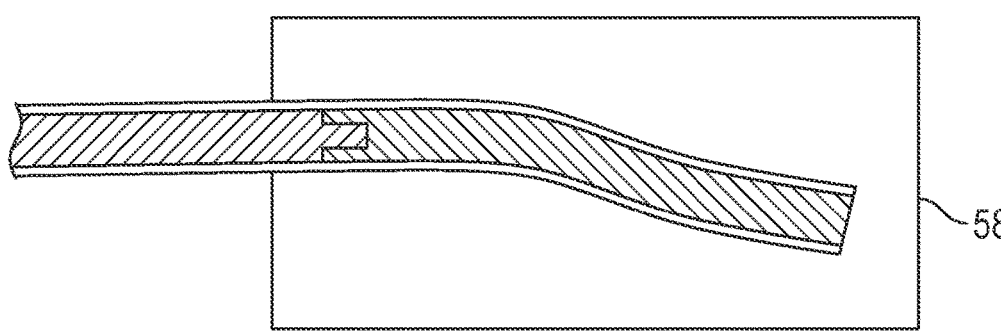
Figure 15:
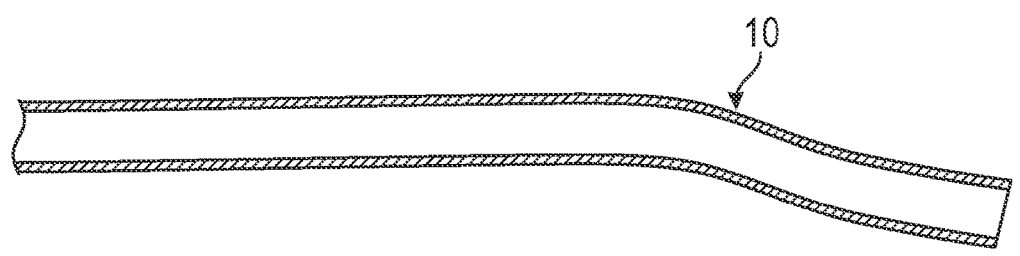
FIG. 15 is an illustration of a final golf club shaft product created using the method illustrated in FIG. 13.

A fourth method 160 of manufacturing the bent tip composite golf club shaft 10 of the present invention is shown in FIG. 13. In a first step 162, prepreg sheets 14 are cut to desired shapes. In a second step 164, the prepreg sheets 14 and/or a tubular braided composite 16 are wrapped around a flexible core 17 that is engaged with a rod 52 made of a rigid material such as metal to form a first precursor, and in a third step 166, the first precursor is rolled to form a straight, second precursor shaft 18 as shown in FIG. 14A. In a fourth step 168, tape is wrapped around the second precursor shaft 18 to provide pressure during curing, and in a fifth step 170, the resulting combination is cured to form a third precursor shaft 19. In a sixth step 172, the tip 19a of the third precursor shaft 19 is placed in a forming mold 58 while still at a temperature above the Tg, as shown in FIG. 14B, to bend the tip 19a; the flexible core 17 can bend, while the metal rod 52 does not. In a seventh step 174, the resulting structure is subjected to a final cure, in an eighth step 176, the flexible core 17 and rod 52 are removed from the structure, and in a ninth, final step 178, the structure is cosmetically finished to result in the final golf club shaft 10 shown in FIG. 15.

Figure 16:
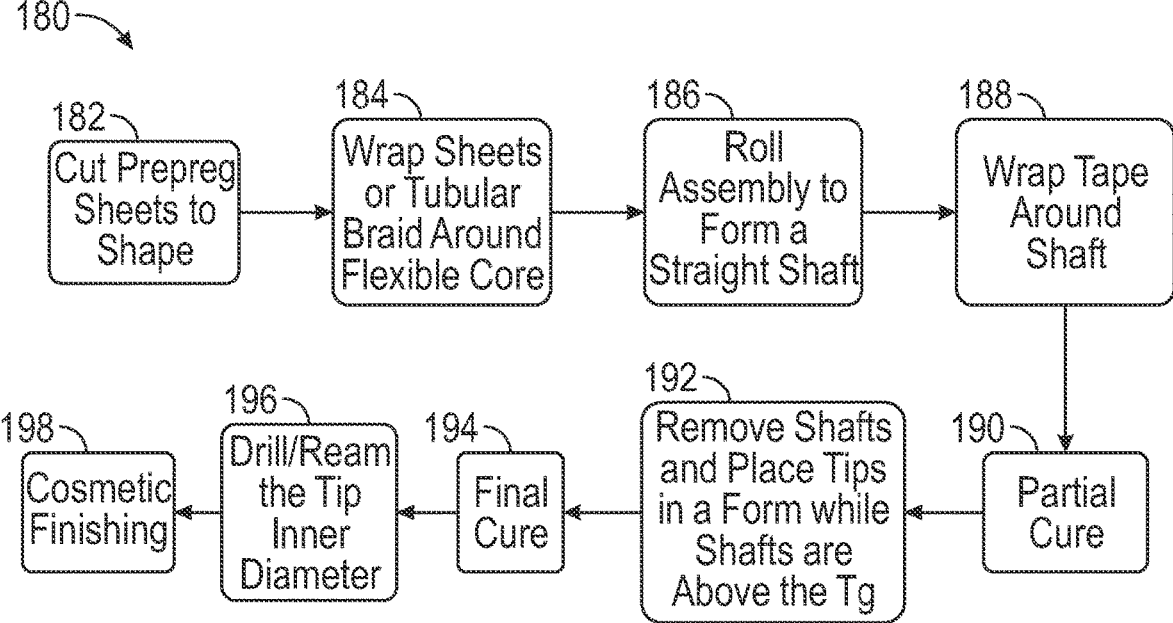
FIG. 16 is a process flow chart illustrating a fifth method of the present invention.
Figure 17A:
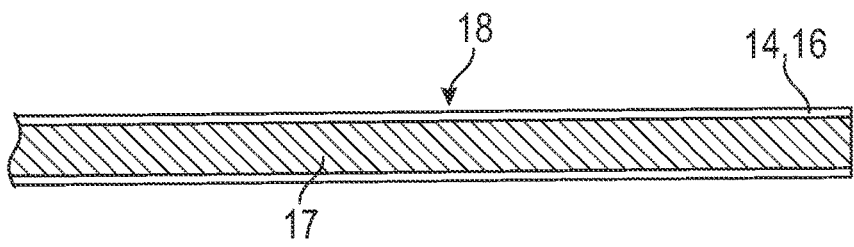
FIGS. 17A, 17B, and 17C are illustrations of golf club shaft precursors and the final product created using the method shown in FIG. 16.
Figure 17B:
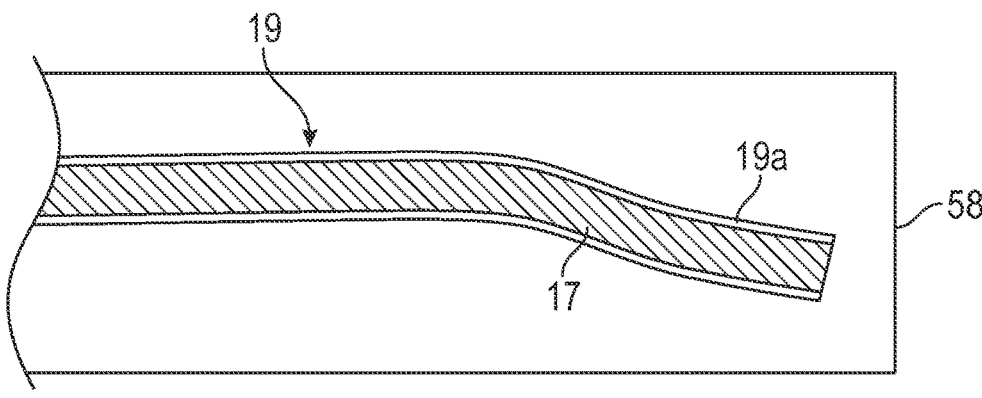
Figure 17C:
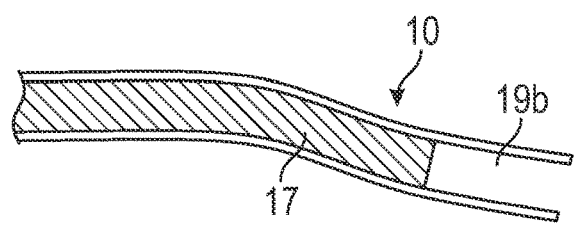

A fifth method 180 of manufacturing the bent tip composite golf club shaft 10 of the present invention is shown in FIG. 16. In a first step 182, prepreg sheets 14 are cut to desired shape. In a second step 184, the prepreg sheets 14 and/or a tubular braided composite 16 are wrapped around a flexible core 17, which may be made of foam, to form a first precursor, and in a third step 186, the first precursor is rolled to form a straight, second precursor shaft 18 as shown in FIG. 17A. In a fourth step 188, tape is wrapped around the second precursor shaft 18 to provide pressure during curing, and in a fifth step 190, the resulting combination is partially cured to form a third precursor shaft 19. In a sixth step 192, the tip 19a of the third precursor shaft 19 is placed in a forming mold 58 while still at a temperature above the Tg, as shown in FIG. 17B, to bend the tip 19a. In a seventh step 194, the resulting structure is subjected to a final cure, in an eighth step 196, the inner diameter of the tip 19a is drilled or reamed to form a pocket 19b in the tip 19a shaped to receive a spud hosel, and in a ninth, final step 198, the structure is cosmetically finished to result in the final golf club shaft 10 shown in FIG. 17C. The core 17 remains in the shaft 10 in this embodiment.

Figure 18:
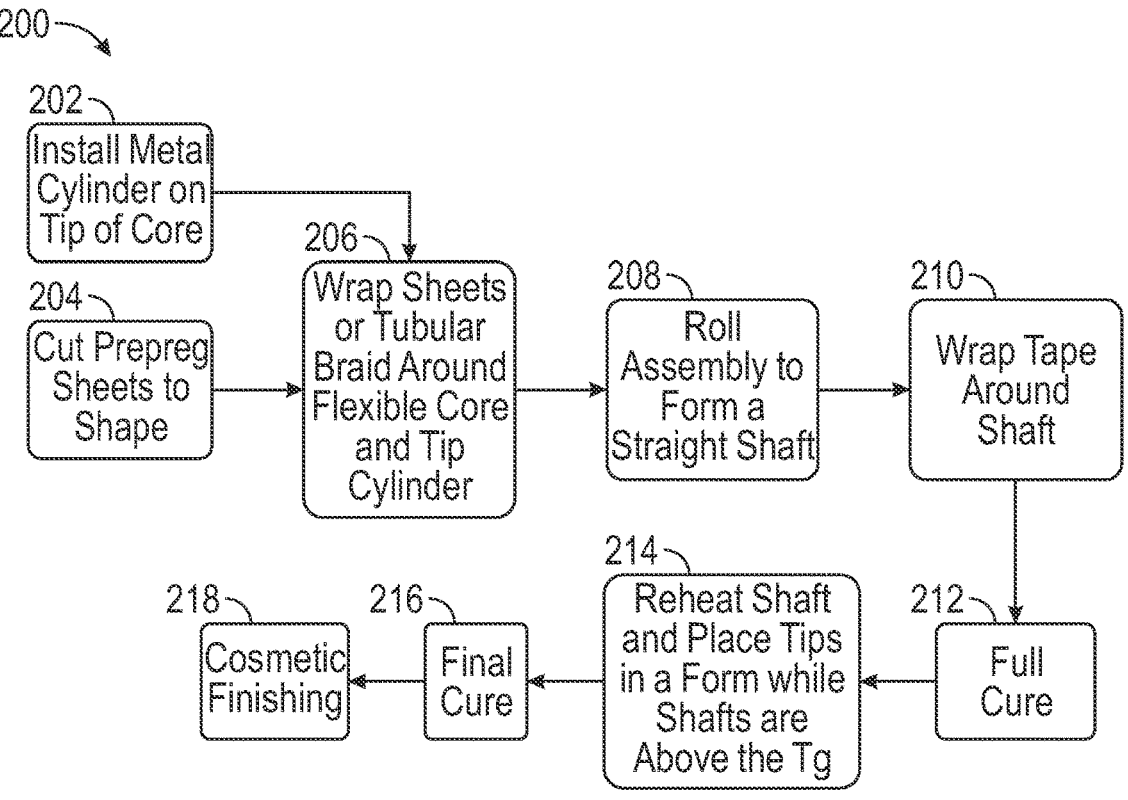
FIG. 18 is a process flow chart illustrating a sixth method of the present invention.
Figure 19A:
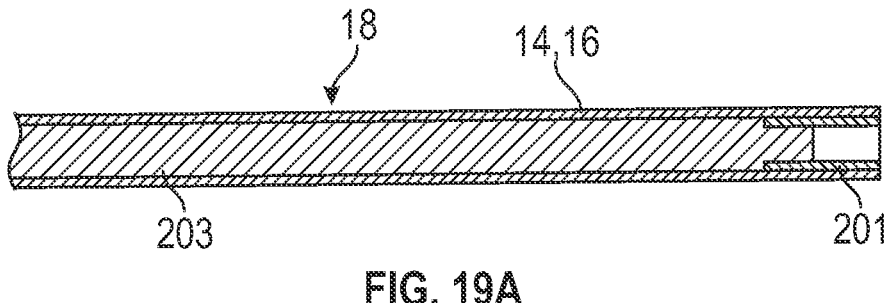
FIGS. 19A and 19B are illustrations of golf club shaft precursors created during the method shown in FIG. 18.
Figure 19B:
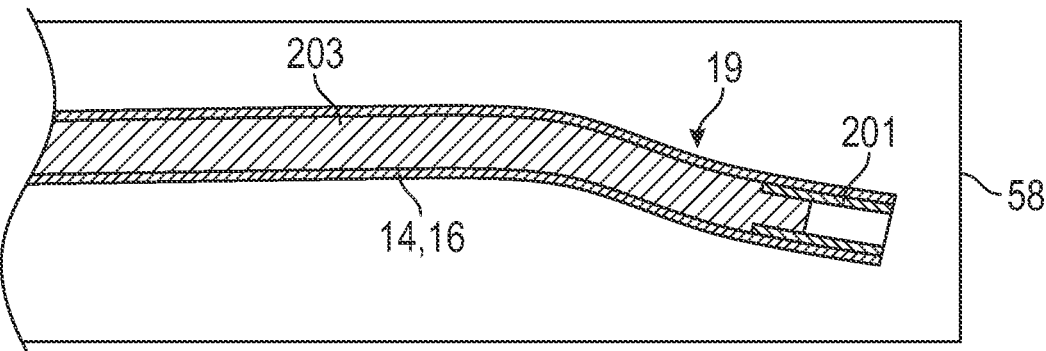
Figure 20:
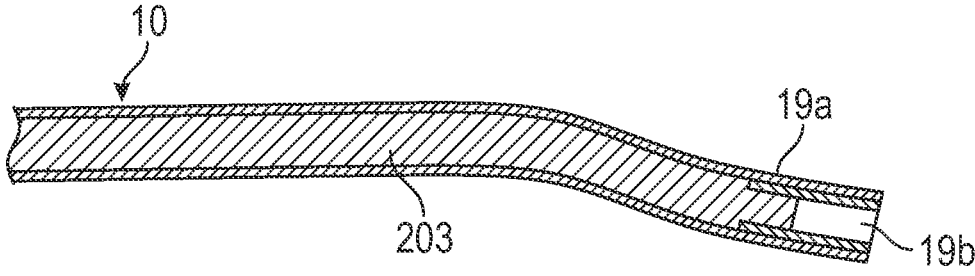
FIG. 20 is an illustration of a final golf club shaft product created using the method illustrated in FIG. 18.

A sixth method 200 of manufacturing the bent tip composite golf club shaft 10 of the present invention is shown in FIG. 18. In a first step 202, a cylinder 201 made of a rigid material such as metal or plastic is installed on the tip of a core 203, which may be a permanent flexible core or foam. In a second step 204, which may occur simultaneously with the first step 202, prepreg sheets 14 are cut to desired shape. In a third step 206, the prepreg sheets 14 and/or a tubular braided composite 16 are wrapped around the core 203 to form a first precursor, and in a fourth step 208, the first precursor is rolled to form a straight, second precursor shaft 18 as shown in FIG. 19A. In a fifth step 210, tape is wrapped around the second precursor shaft 18 to provide pressure during curing, and in a sixth step 212, the resulting combination is fully cured to form a third precursor shaft 19. In a seventh step 214, the at least the tip 19a of the third precursor shaft 19 is reheated and placed in a forming mold 58 while still at a temperature above the Tg, as shown in FIG. 19B, to bend the tip 19a. In an eighth step 216, the resulting structure is subjected to a final cure, and in a ninth step 218, the structure is cosmetically finished to result in the final golf club shaft 10 shown in FIG. 20. As shown in FIG. 20, this golf club shaft 10 includes a pocket 19b in the tip 19a (created by the cylinder 201) so it can receive a spud hosel, and the core 17 remains in the shaft 10.

Figure 21:
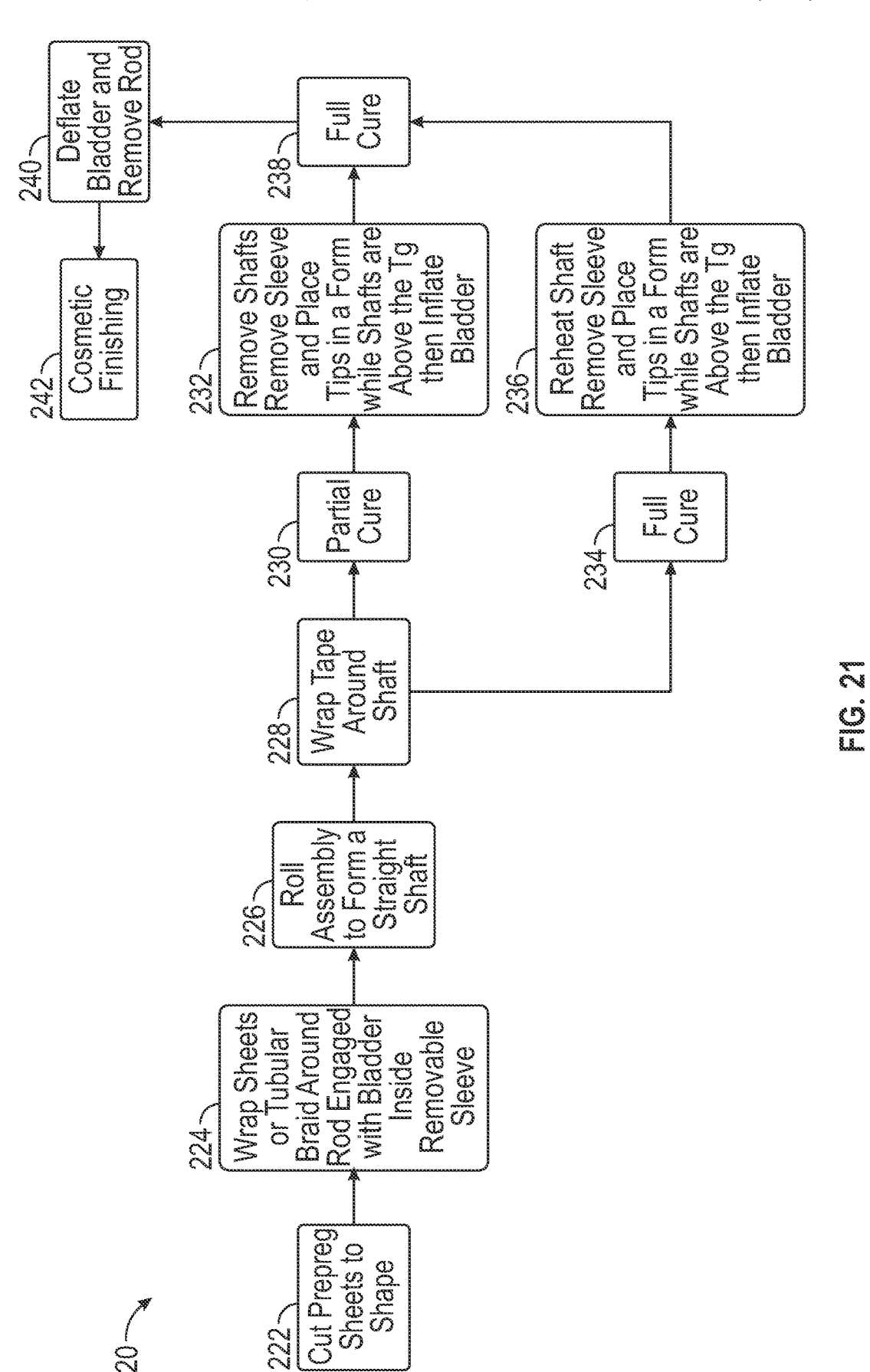
FIG. 21 is a process flow chart illustrating a seventh method of the present invention.
Figure 22A:
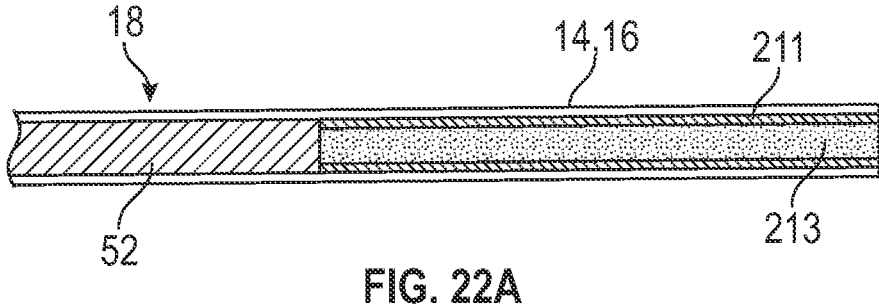
FIGS. 22A and 22B are illustrations of golf club shaft precursors created during the method shown in FIG. 21.

A seventh method 220 of manufacturing the bent tip composite golf club shaft 10 of the present invention is shown in FIG. 21. In a first step 222, prepreg sheets 14 are cut to desired shape, and in a second step 224, the prepreg sheets 14 and/or a tubular braided composite 16 are wrapped around a tapered rod 52 made of a rigid material, such as plastic or metal, which is engaged with a removable sleeve 211 that houses an inflatable bladder 213, to form a first precursor. In a third step 226, the first precursor is rolled to form a straight, second precursor shaft 18 as shown in FIG. 22A, and in a fourth step 228, tape is wrapped around the second precursor shaft 18 to provide pressure during curing.

Figure 22B:
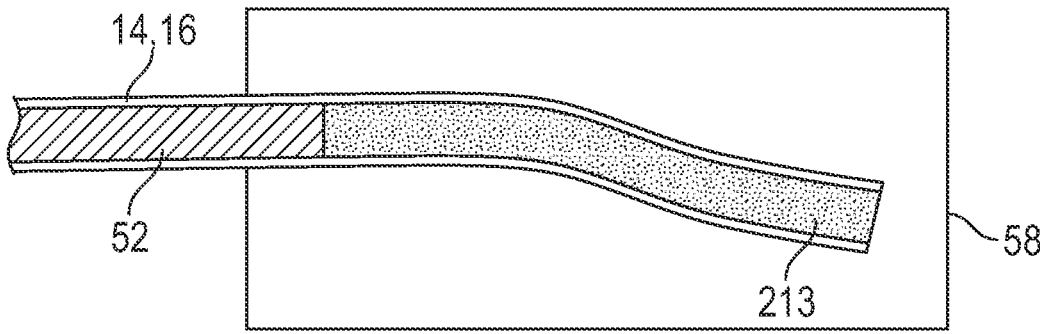

At this point, the method 220 diverges into two possible paths. According to the first path, in a fifth step 230, the structure is subjected to a partial cure, and in a sixth step 232, the sleeve 211 is removed to form a third precursor shaft 19, the tip 19a of which is placed in a forming mold 58 while still at a temperature above the Tg, as shown in FIG. 22B, and the bladder 213 is inflated during bending to support the tip 19a during bending. According to the second path, in a seventh step 234, the second precursor shaft 18 is fully cured, and in an eighth step 236, the sleeve 211 is removed to form a third precursor shaft 19, the tip 19a of which is placed in a forming mold 58 while still at a temperature above the Tg, as shown in FIG. 22B, and the bladder 213 is inflated during bending to support the tip 19a during bending.

Figure 23:
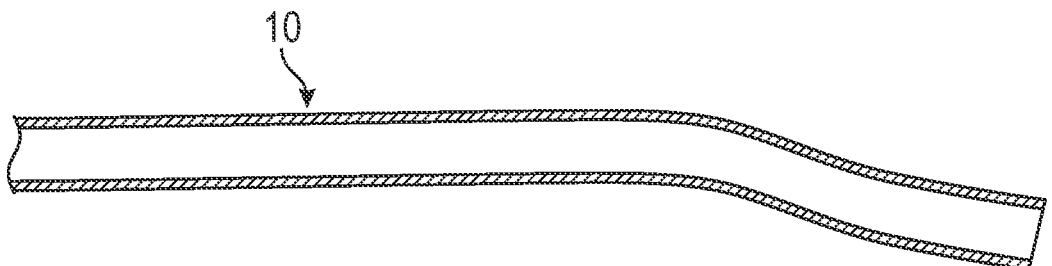
FIG. 23 is an illustration of a final golf club shaft product created using the method illustrated in FIG. 21.

The paths converge at a ninth step 238, when the structure is subjected to a final cure process. In a tenth step 240, the bladder 213 is deflated and both the bladder 213 and tapered rod 52 are removed from the structure, which is then subjected to cosmetic finishing in an eleventh step 242 to result in the final, hollow golf club shaft 10 shown in FIG. 23. In an alternative embodiment, this seventh method 220 may be adjusted by leaving out the removable sleeve, and another alternative embodiment, the method 220 may be adjusted by replacing the tapered rod 52 with a metal cylinder that is left in the golf club shaft 10 permanently.

Figure 24:
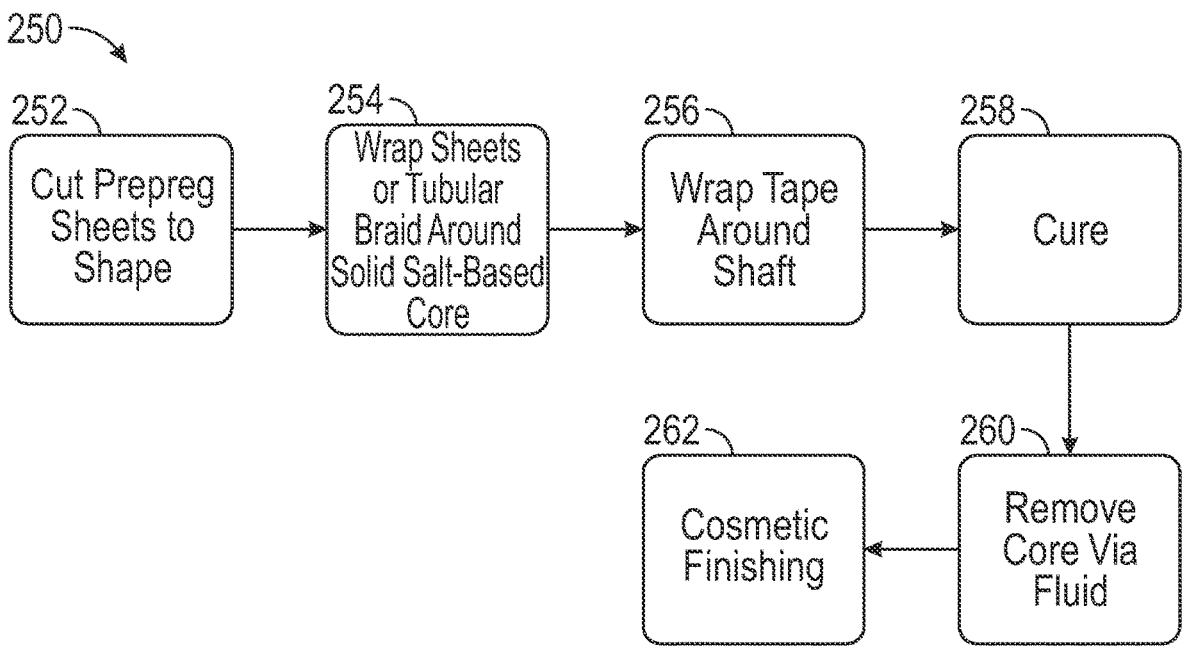
FIG. 24 is a process flow chart illustrating an eighth method of the present invention.
Figure 25:
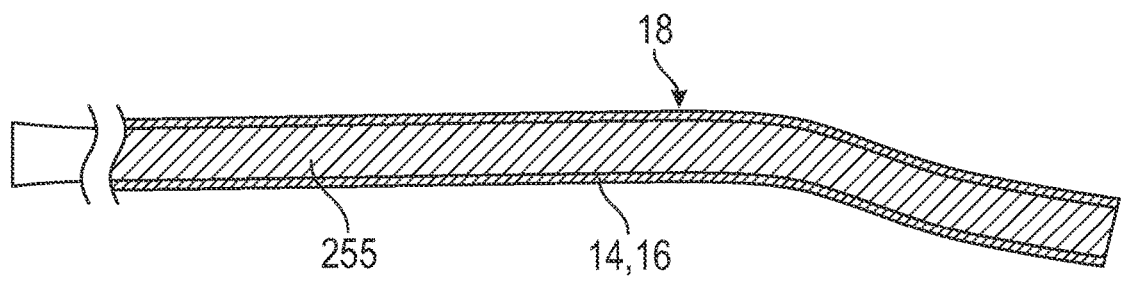
FIG. 25 is an illustration of a golf club shaft precursor created during the method shown in FIG. 24.
Figure 26:
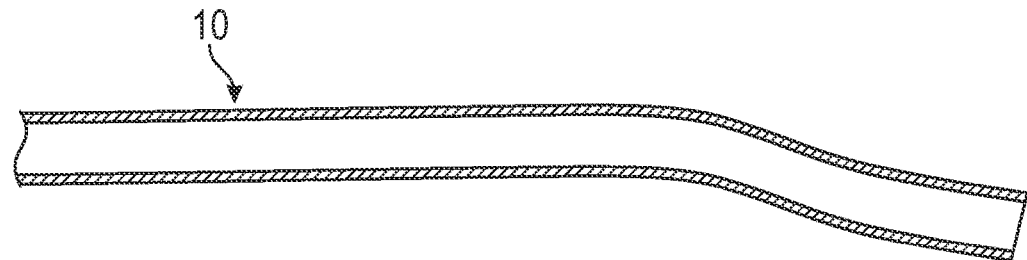
FIG. 26 is an illustration of a final golf club shaft product created using the method illustrated in FIG. 24.
Figure 27:
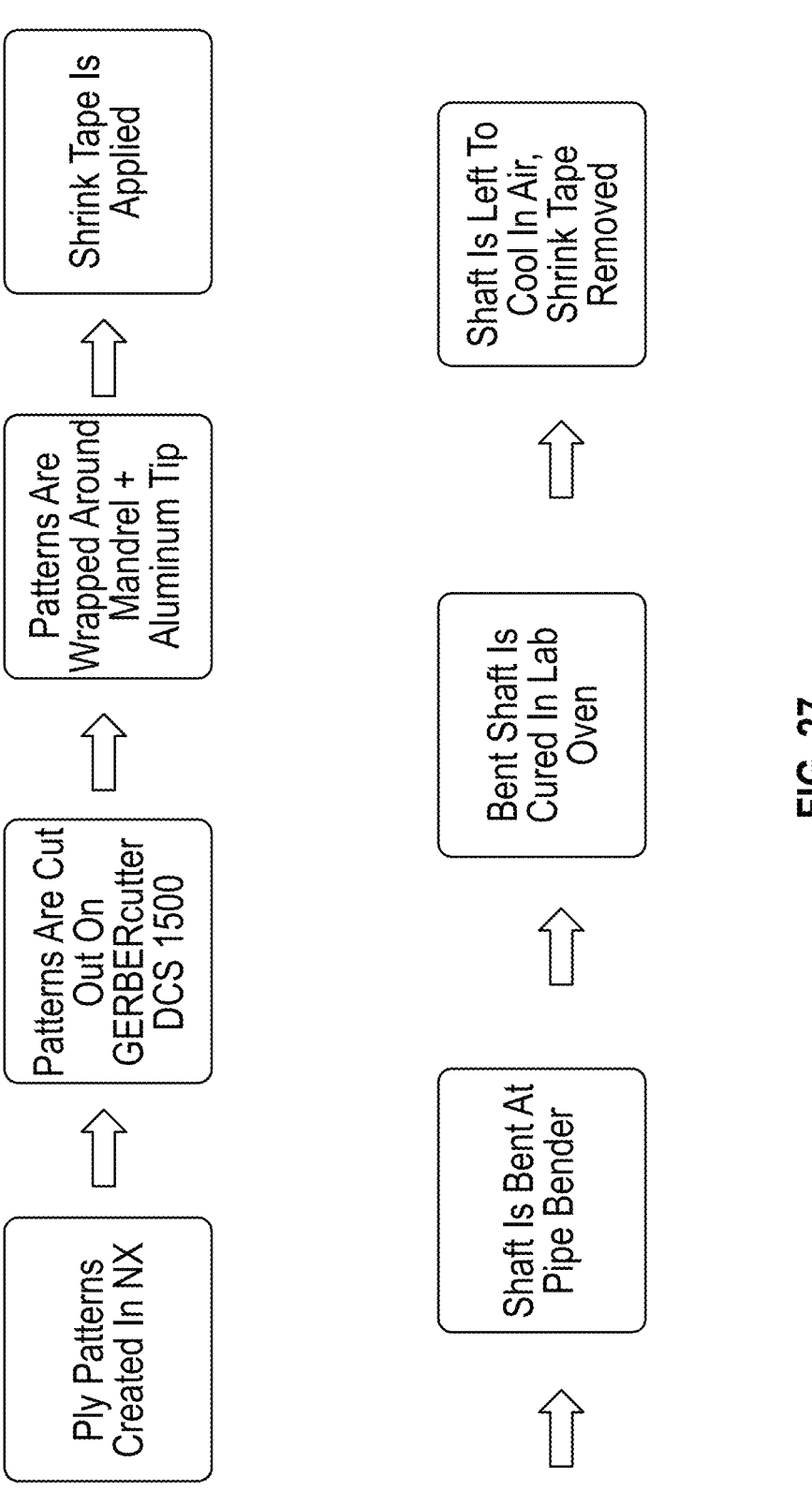
FIG. 27 is a block diagram of a flow chart for a method for manufacturing a full carbon fiber reinforced polymer double bend putter shaft.
Figure 28:
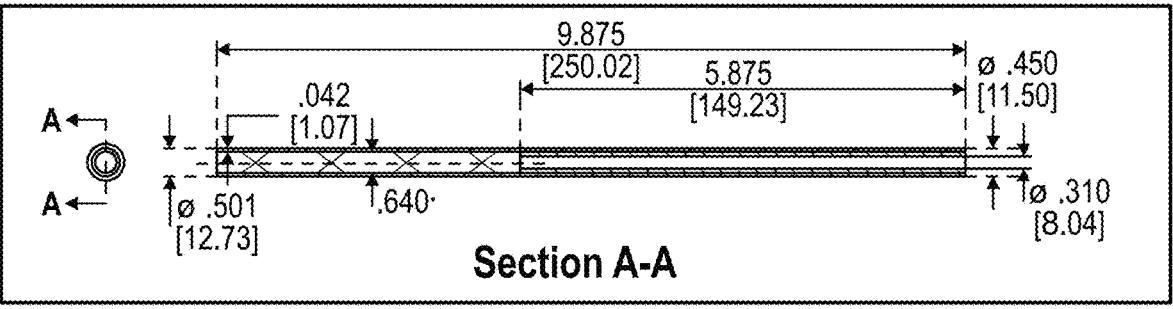
FIG. 28 is an illustration of a pre-finished shaft.
Figure 29:
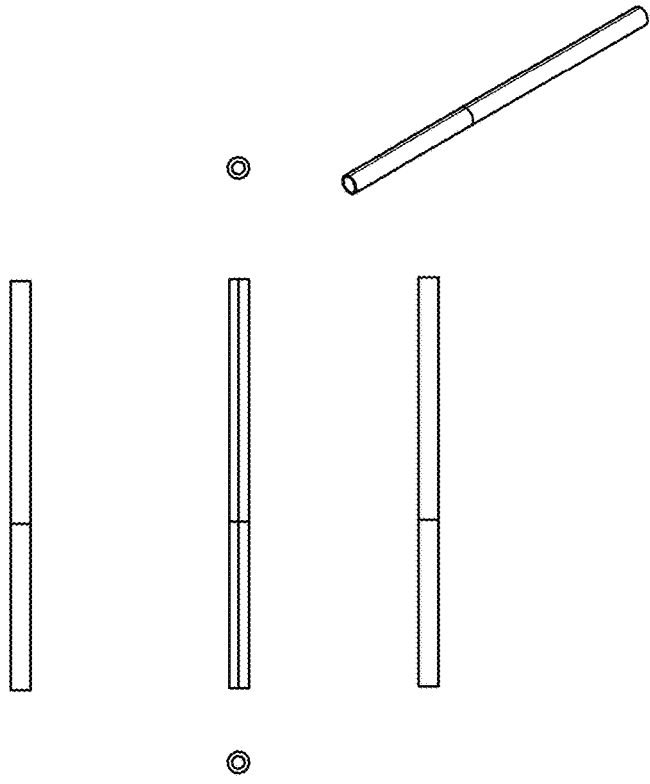
FIG. 29 is an illustration of ply patterns for a putter shaft.

A final, eighth method 250 of manufacturing the bent tip composite golf club shaft 10 of the present invention is shown in FIG. 24. In a first step 252, prepreg sheets 14 are cut to desired shape, and in a second step 254, the prepreg sheets 14 and/or a tubular braided composite 16 are wrapped around a solid, dissolvable core 255, which may be made of a salt or foam, to form a precursor shaft 18 shown in FIG. 25. In a third step 256, tape is wrapped around the second precursor shaft 18 to provide pressure during the fourth, curing step 258. In a fifth step 260, the core 255 is dissolved with a fluid, and in a sixth step 262, the resulting structure is finished cosmetically to result in the final, hollow golf club shaft 10 shown in FIG. 26.

In the context of putter-type golf club heads, lower torque measurements directly relate to lower putter head twist at impact, also known as twist robustness, which is a proxy for how far offline a putt will go relative to alignment. Composite shafts can provide equal or lower twist at impact values than steel shafts, and are significantly lighter than steel shafts. The lower mass of the shaft resulting from the inventive methods disclosed herein allows a putter to be counterbalanced with weight at the grip, which creates a more consistent putting stroke. The shafts formed from the inventive methods disclosed herein also frees up discretionary weight that can be placed in the putter head to provide a more consistent putting stroke while keeping the club at the same swing weight and overall weight. The bend in the composite shaft allows for a low-torque, light putter shaft with the possibility of creating a face-balanced club utilizing a bent tip. Testing also shows that higher frequency is statistically significantly related to higher ball speed, more top spin, and a higher launch angle at impact. Since those are all desirable results, the shaft preferably has a minimum frequency threshold.

Another embodiment of the present invention is methodology used to obtain a full carbon fiber reinforced polymer double bend putter shaft wherein the summation of the two bending angles is 9 degrees. Starting pre-resin impregnated unidirectional carbon fiber reinforced polymers was sectioned into appropriate ply patterns (flags). 15 flags in total were sectioned, with five oriented in the +45 degree orientation, 4 in the −45, and 6 in the 0 degree orientation. These flags were gathered and set aside in the assembly area. Following, a stepped steel mandrel was joined to a hollow ⅜ of an inch T6 6061 aluminum mandrel. Both combined serve as the mold basis wherein the previously sectioned flags are to be wrapped. Starting with the first flag oriented in the +45 degree direction, the pattern alternates between +45 and −45 until the nine flags are wrapped. Following these is the six 0 degree oriented plies.

The methodology for wrapping the flags around the tip and mandrel are of two forms. Supporting the mandrel+tip in a vice, the operator removes all protective backings from the composite flags and begins to wrap around the joined base. Subsequently, the next flag is then wrapped atop the first, in a process that builds outwards. After the application of all composite flags, ½ inch wide release film coated shrink tape is then applied. The application of the shrink tape is done with a ¼ inch overlap, done at a 45 degree angle, and secured upon end of the composite with high temperature tape. This process is repeated in the −45 degree direction with the same ¼ inch overlap and termination procedure.

The finished wrapped tapered mandrel+tip is placed inside a furnace at 175 degrees Fahrenheit. The purpose of this is to elevate the viscosity of the resin, and therefore the ability of the fibers to conform to a bending procedure.

Immediately following the staging procedure, the un-cured shaft is then brought to an industry pipe bender and undergoes the necessary geometric bends, resulting in the final desired shape and structure. Following this bending procedure, the composite shaft+tapered mandrel+tip reinforcement is then placed into an oven at 300 degrees Fahrenheit for 10 minutes. It is important to note that the sample is hung vertically in the furnace for the entire duration of the curing cycle. During the cure process, the shrink tape applies roughly 8.5 pounds of force.

After the curing cycle has completed, the sample is removed and brought to room temperature with ambient air cooling. Once the sample and supporting structures are brought to room temperature, the mandrel is then removed from the composite shaft+reinforcement tip.

Figure 30:
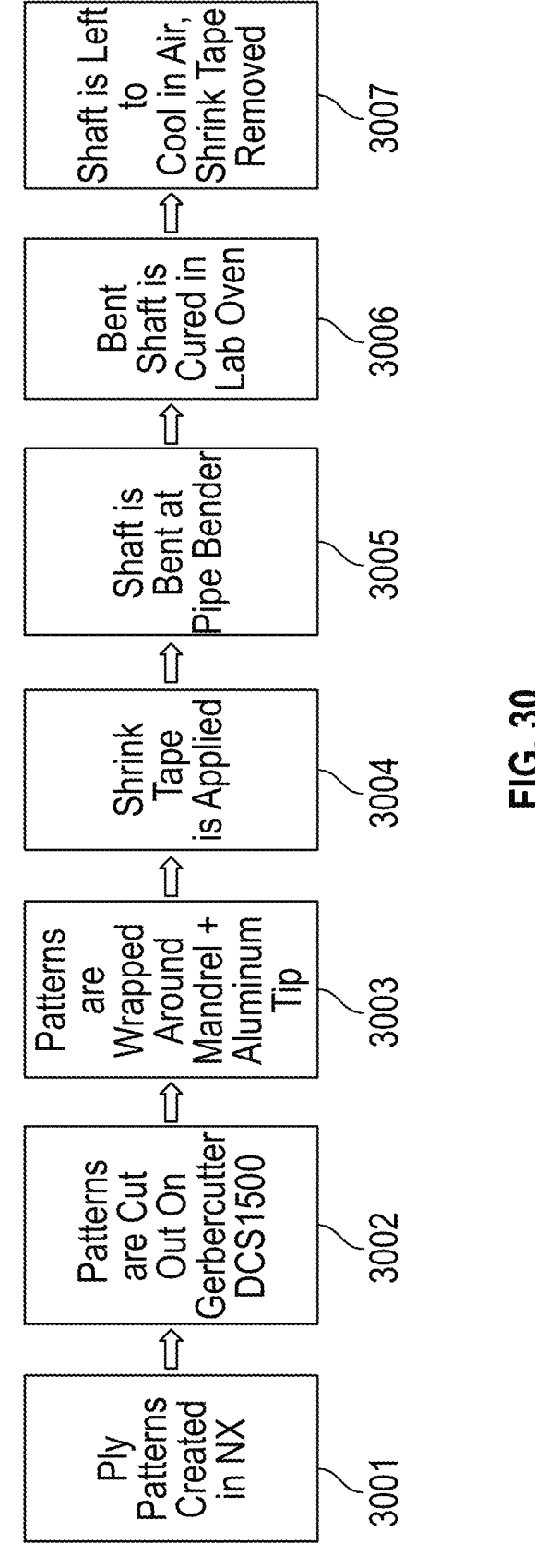
FIG. 30 is a flow chart of a method for manufacturing a full carbon fiber reinforced polymer double bend putter shaft.

FIG. 30 is a flow chart 3000 of a method for manufacturing a full carbon fiber [0077] reinforced polymer double bend putter shaft having steps 3001-3007.

Figure 31:
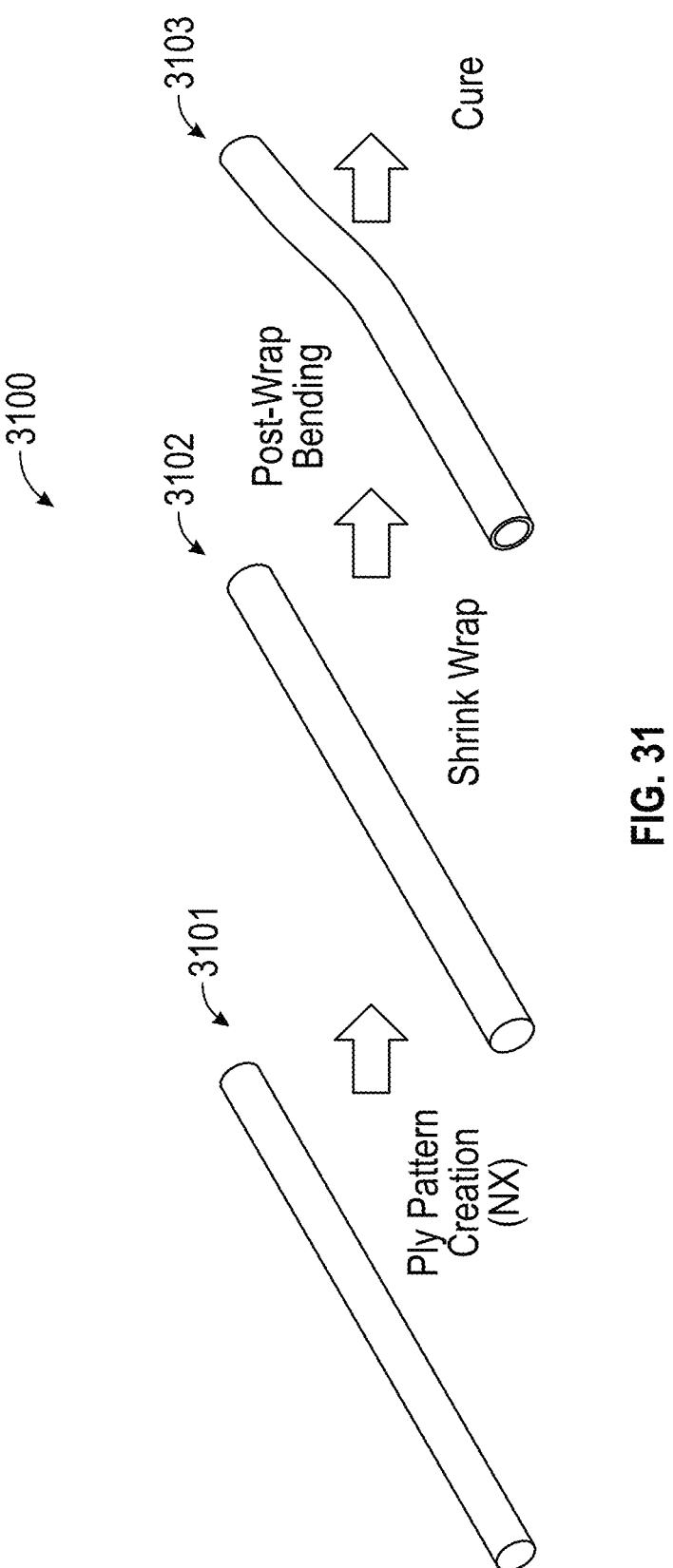
FIG. 31 is an illustration of the transformation of plies into the finished double ben putter shaft.

FIG. 31 is an illustration 3100 of the transformation of plies 3101 into a shrink wrapped mandrel 3202 into the finished double bent putter shaft 3103.

Figure 32:
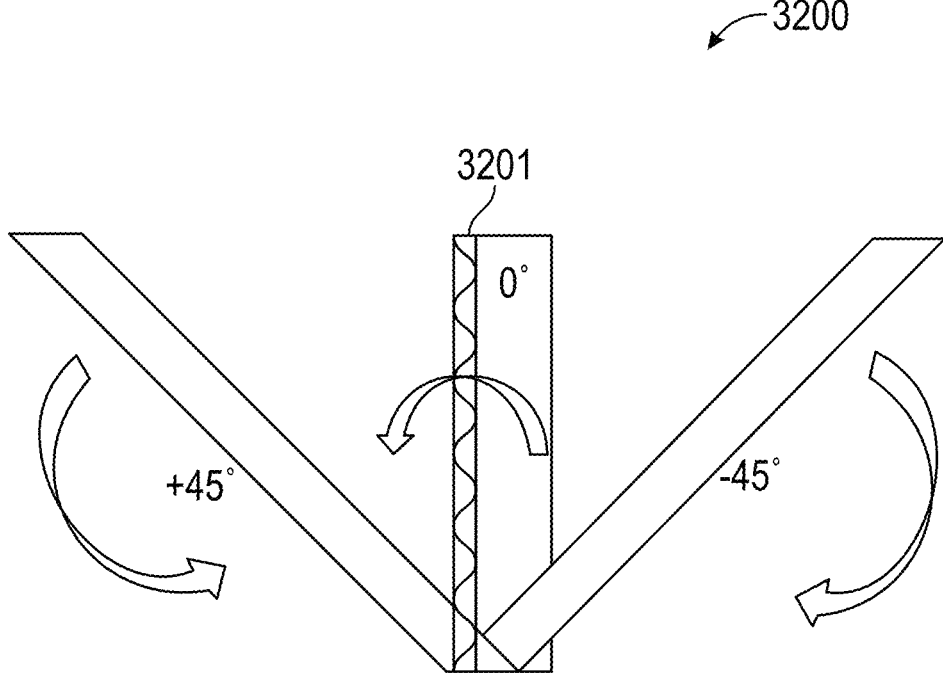
FIG. 32 is an illustration of the angles of the plies applied to the mandrel.

FIG. 32 is an illustration 3200 of the angles of the plies applied to the mandrel 3201.

Figure 33:
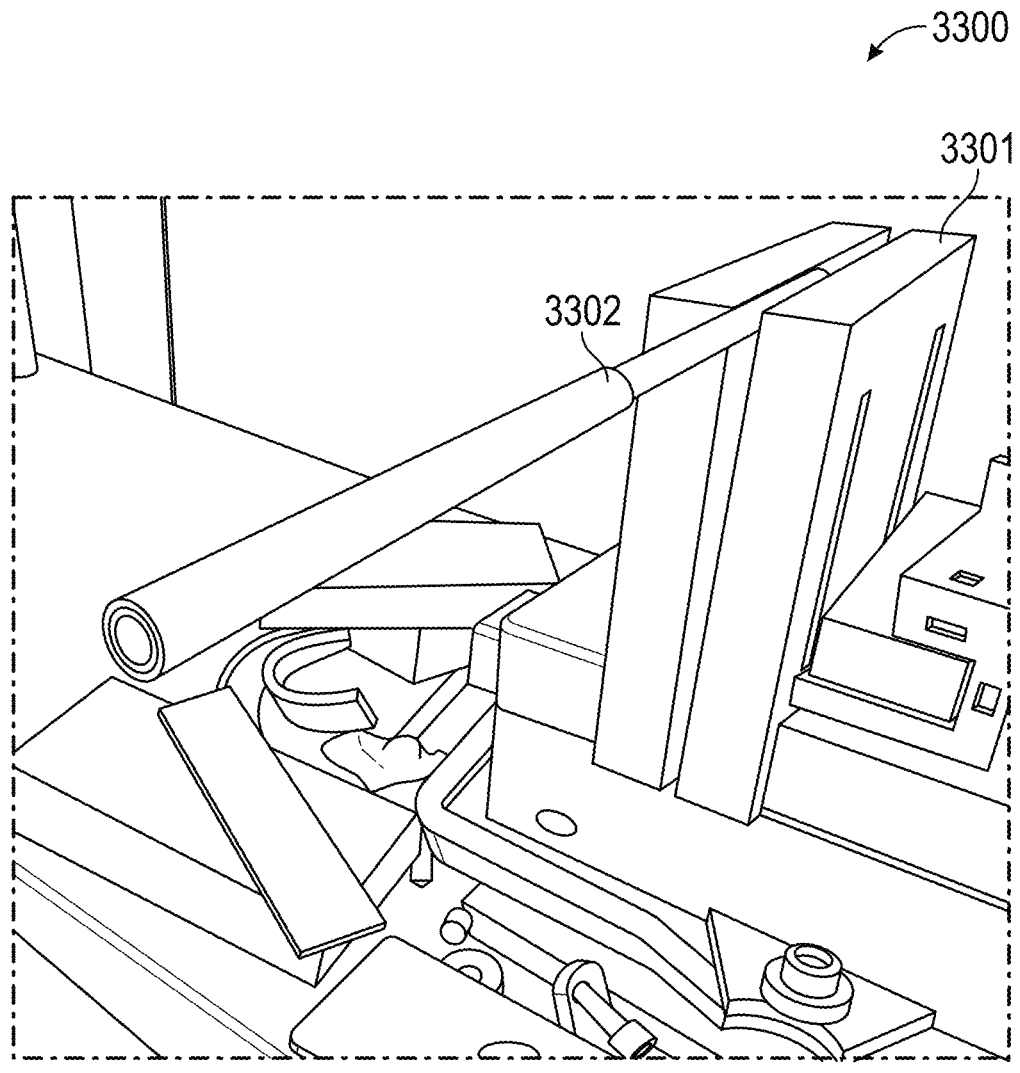
FIG. 33 is an illustration of the pipe bender.

FIG. 33 is an illustration 3300 of the pipe bender 3301 with an uncured wrapped mandrel.

Figure 34:
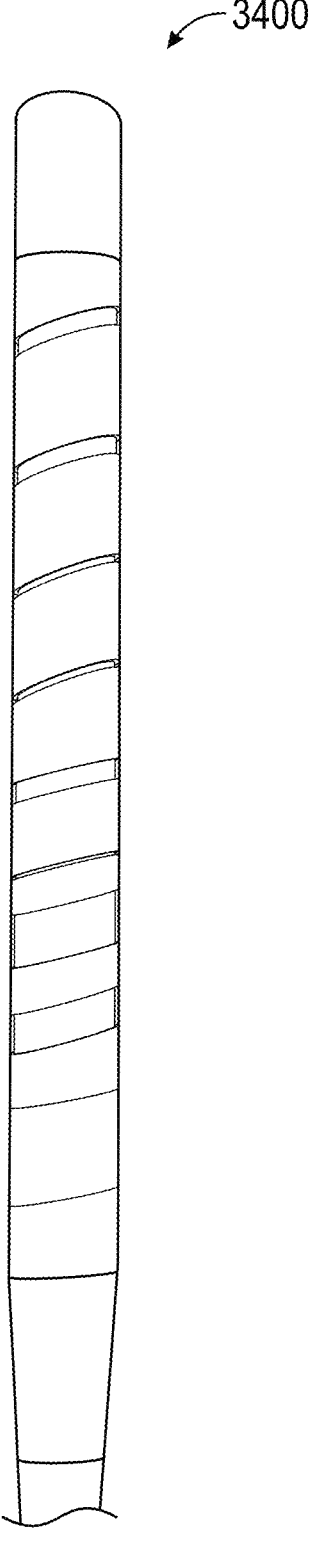
FIG. 34 is an illustration of a wrapped mandrel.

FIG. 34 is an illustration 3400 of a wrapped mandrel.

Figure 35:
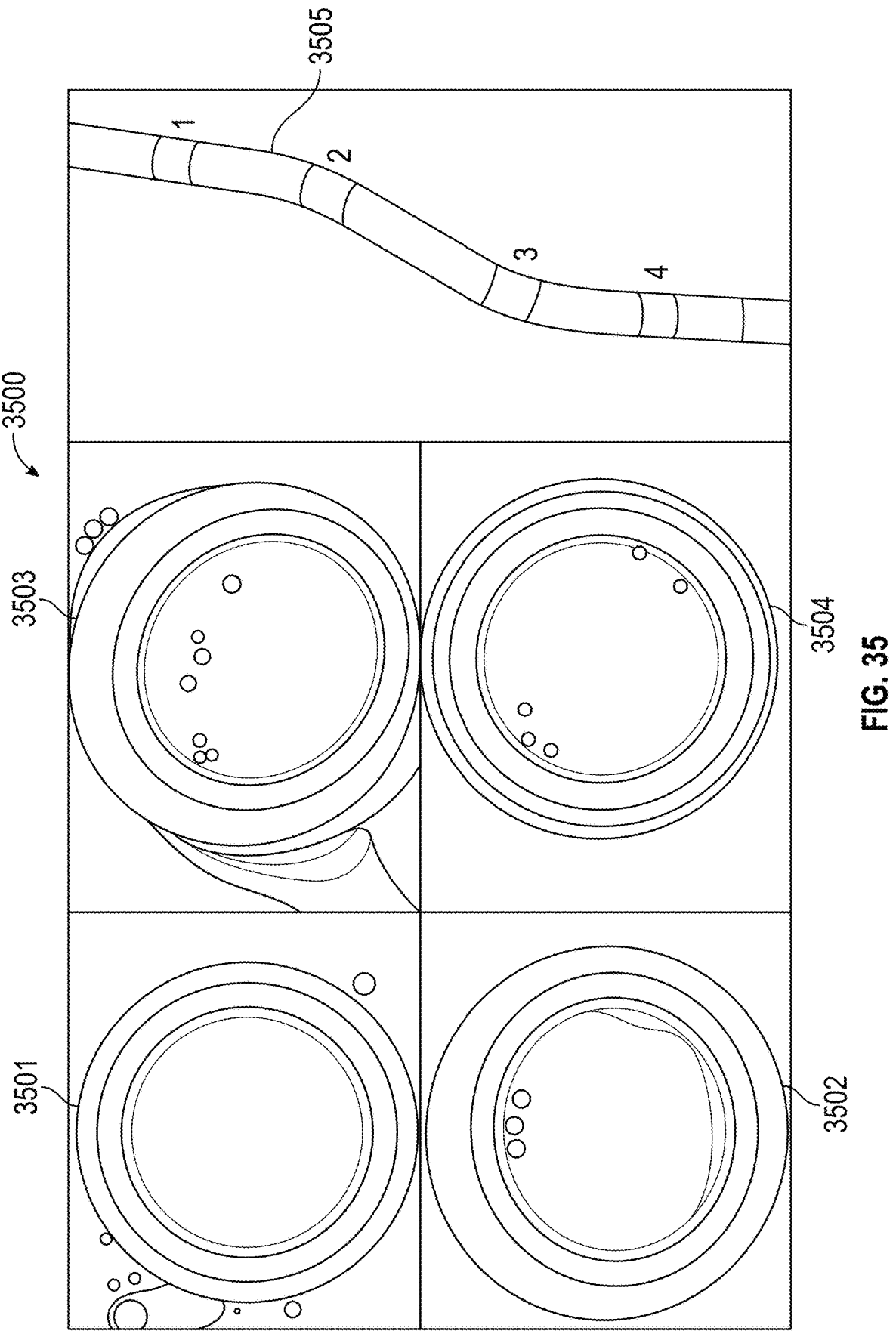
FIG. 35 is an illustration of cross-sectional views of a bent shaft at four points.

FIG. 35 is an illustration 3500 of cross-sectional views 3501-03504 of a bent shaft 35005 at four points.

Figure 36:
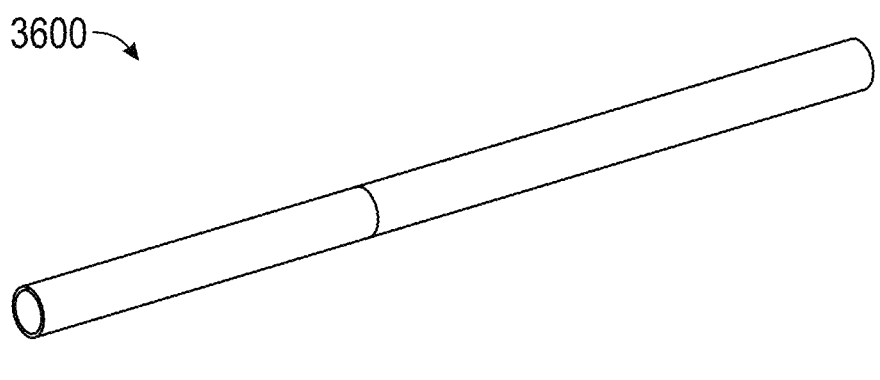
FIG. 36 is an illustration of a mandrel.

FIG. 36 is an illustration 3600 of a mandrel.

Figure 37:
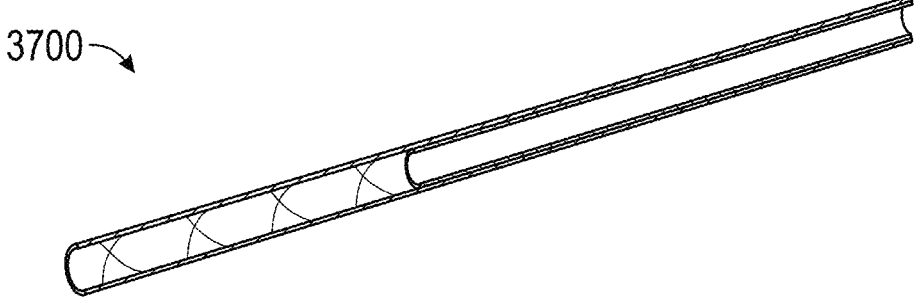
FIG. 37 is an illustration of a partially wrapped mandrel.

FIG. 37 is an illustration 3700 of a partially wrapped mandrel.

Figures 38, 39:
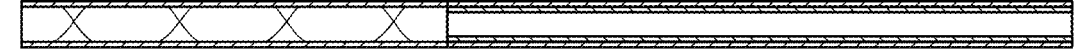
FIG. 38 is an illustration of a mandrel.
FIG. 39 is an illustration of a partially wrapped mandrel.

FIG. 38 is an illustration 3800 of a mandrel.

FIG. 39 is an illustration 3900 of a partially wrapped mandrel.

Figure 40:
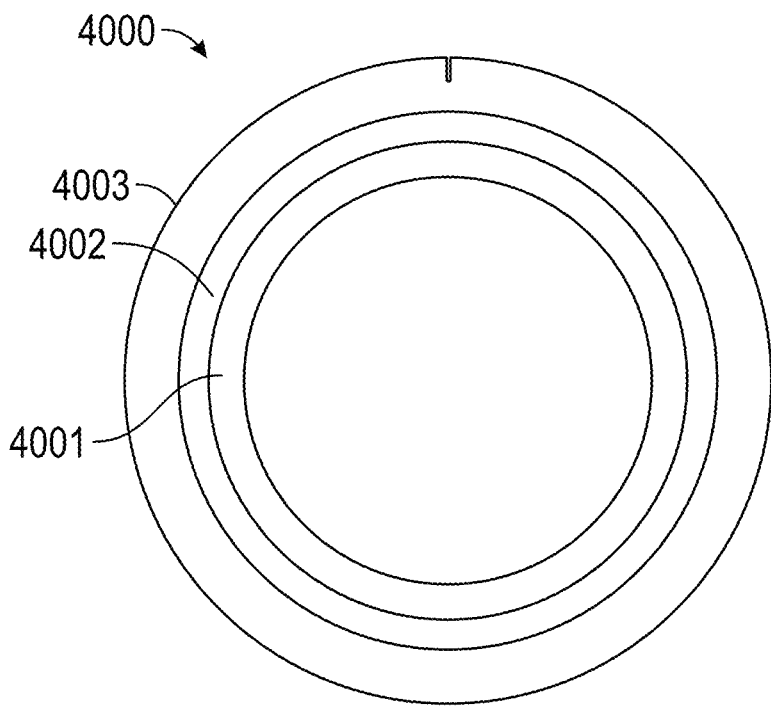
FIG. 40 is a cross-sectional view of a wrapped mandrel.

FIG. 40 is a cross-sectional view of a shrink-wrapped mandrel 4000 showing the mandrel 4001, the plies 4002 and the shrink wrap 4003.

Figure 41:
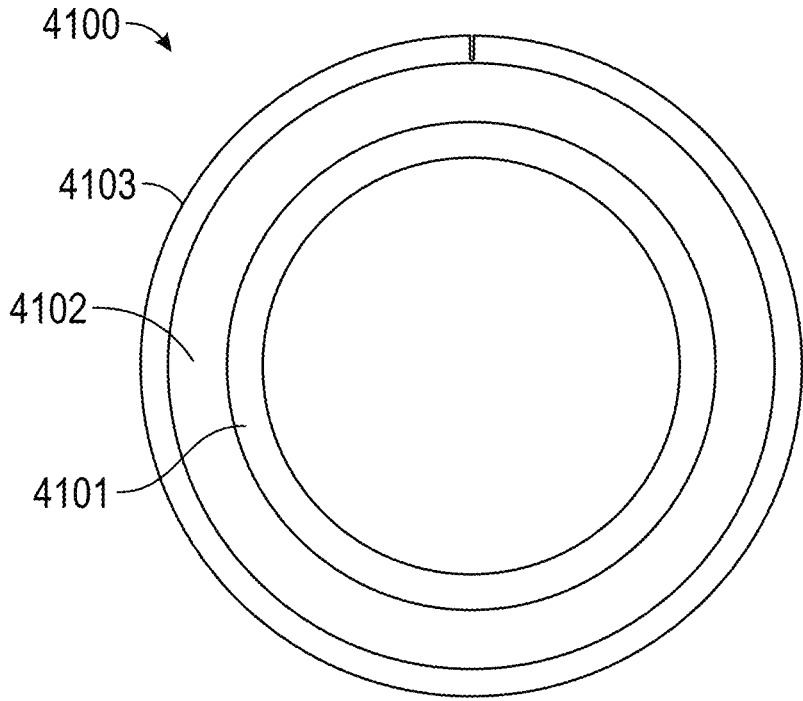
FIG. 41 is a cross-sectional view of a wrapped mandrel.

FIG. 41 is a cross-sectional view of a shrink-wrapped mandrel 4100 showing the mandrel 4101, the plies 4102 and the shrink wrap 4103.

Figure 42:
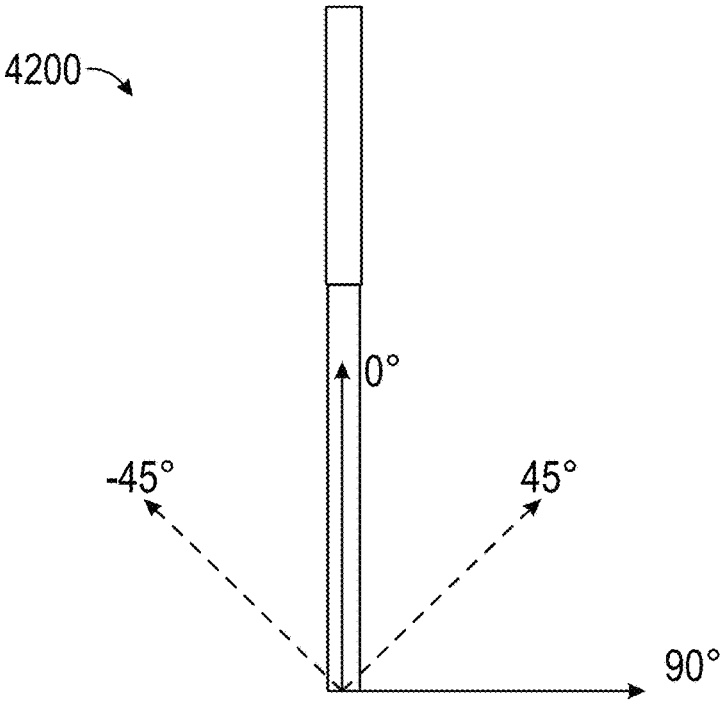
FIG. 42 is an illustration of the angles of the plies applied to the mandrel.

FIG. 42 is an illustration 4200 of the angles of the plies applied to the mandrel.

Figure 43:
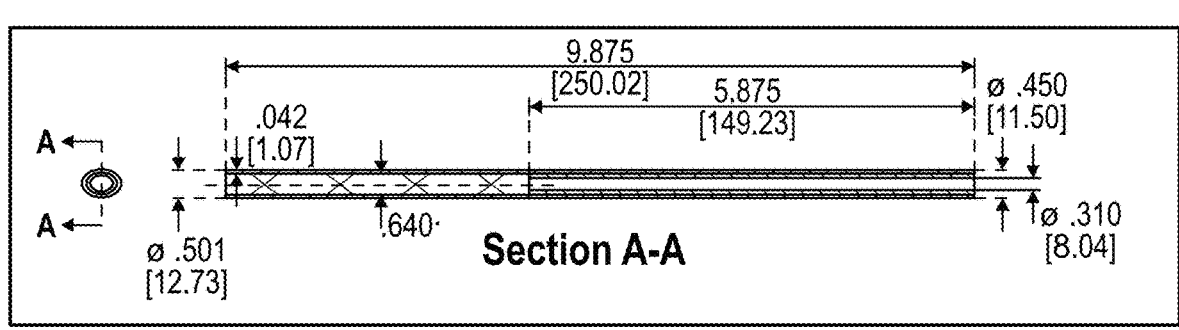
FIG. 43 is an illustration of a wrapped mandrel.

FIG. 43 is an illustration 4300 of a wrapped mandrel.

U.S. patent application Ser. No. 17/497,643, filed on Oct. 8, 2021, is hereby incorporated by reference in its entirety.

U.S. patent application Ser. No. 17/497,059, filed on Oct. 8, 2021, is hereby incorporated by reference in its entirety.

Johnston et al., U.S. patent application Ser. No. 17/525,892, filed on Nov. 13, 2021, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. The section titles included herein also are not intended to be limiting. Therefore, the embodiments of the invention in which an exclusive property or privilege is claimed are defined in the following appended claims.

We claim as our invention the following:

1. A method for manufacturing a carbon reinforced polymer double bend putter shaft, the method comprising:

wrapping a plurality of plies on a mandrel comprising a steel body and an aluminum tip to create a wrapped mandrel, wherein the plurality of plies comprises plus forty-five degree orientation pattern plies, minus forty-five degree orientation pattern plies and zero degree orientation pattern plies;

applying a release film coated shrink wrap tape to the wrapped mandrel to create a shrink wrapped mandrel with an overlap that is secure at one end with a tape;

heating the shrink-wrapped mandrel at approximately one seventy-five degrees Fahrenheit to elevate the viscosity of a resin of the plurality of plies to create an uncured shaft;

bending the un-cured shaft in a pipe bender at a first angle and then at a second angle to create an uncured bent shaft;

heating the uncured bent shaft in a vertical position at approximately three hundred degrees Fahrenheit for at least ten minutes to create a cured bent shaft, wherein the release film coated shrink wrap tape applies approximately 8.5 pounds of force during the curing process;

cooling the cured bent shaft to room temperature and removing the mandrel from a finished composite shaft and reinforcement tip to create a final bent composite shaft;

wherein the final bent composite shaft has a first angle A2 at a first bend relative to a first straight portion that ranges from 20 to 25 degrees and a second angle A3 at a second bend relative to a second straight portion that ranges from 12 to 16 degrees.

2. The method according claim 1 wherein the plurality of plies comprises fifteen plies.

3. The method according to claim 2 wherein the plurality of plies comprises 5 plus forty-five degree orientation pattern plies, 4 minus forty-five degree orientation pattern plies and 6 zero degree orientation pattern plies.

4. The method according to claim 3 wherein the 5 plus forty-five degree orientation pattern plies and 4 minus forty-five degree orientation pattern plies are alternately applied to the mandrel and then the 6 zero degree orientation pattern plies are applied to the mandrel.

* * * * *